(12) United States Patent
Kimura

(10) Patent No.: US 10,222,594 B2
(45) Date of Patent: Mar. 5, 2019

(54) ZOOM LENS AND IMAGE PICKUP APPARATUS INCLUDING THE SAME

(71) Applicant: CANON KABUSHIKI KAISHA, Tokyo (JP)

(72) Inventor: Kohei Kimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/657,501

(22) Filed: Jul. 24, 2017

(65) Prior Publication Data

US 2018/0039051 A1 Feb. 8, 2018

(30) Foreign Application Priority Data

Aug. 4, 2016 (JP) .................. 2016-153564

(51) Int. Cl.
| | |
|---|---|
| *G02B 15/14* | (2006.01) |
| *G02B 15/20* | (2006.01) |
| *G02B 15/167* | (2006.01) |
| *G02B 27/00* | (2006.01) |
| *G02B 15/173* | (2006.01) |
| *G02B 5/08* | (2006.01) |
| *G02B 27/42* | (2006.01) |

(52) U.S. Cl.
CPC ........... *G02B 15/20* (2013.01); *G02B 15/167* (2013.01); *G02B 15/173* (2013.01); *G02B 27/0025* (2013.01); *G02B 5/0883* (2013.01); *G02B 27/4211* (2013.01)

(58) Field of Classification Search
CPC ...... G02B 13/009; G02B 15/14; G02B 15/16; G02B 15/20; G02B 15/167; G02B 15/173; G02B 27/0025; G02B 5/0883; G02B 27/4211
USPC .................................................. 359/676, 683
See application file for complete search history.

(56) References Cited

U.S. PATENT DOCUMENTS

| | | | |
|---|---|---|---|
| 7,535,657 B2 | 5/2009 | Kuroda et al. | |
| 8,537,249 B2 | 9/2013 | Imaoka et al. | |
| 8,736,968 B2 | 5/2014 | Sato et al. | |
| 2017/0322399 A1* | 11/2017 | Sugita | G02B 15/163 |

* cited by examiner

*Primary Examiner* — William Choi
(74) *Attorney, Agent, or Firm* — Carter, DeLuca, Farrell & Schmidt LLP

(57) ABSTRACT

A zoom lens includes, in order from an object side to an image side, a positive first lens unit, a negative second lens unit, a middle lens group including at least one lens unit, a negative N minus second lens unit, a negative N minus first lens unit, and a positive Nth lens unit, where N is an integer of six or more, in which distances between the adjacent lens units change during zooming, the first lens unit moves toward the object side during zooming from a wide-angle end to a telephoto end, the N minus second lens unit moves during focusing, and a total lens length at the wide-angle end, a backfocus at the wide-angle end, and a lateral magnification of a combined system of the N minus first lens unit and the Nth lens unit at the wide-angle end are set appropriately.

16 Claims, 11 Drawing Sheets

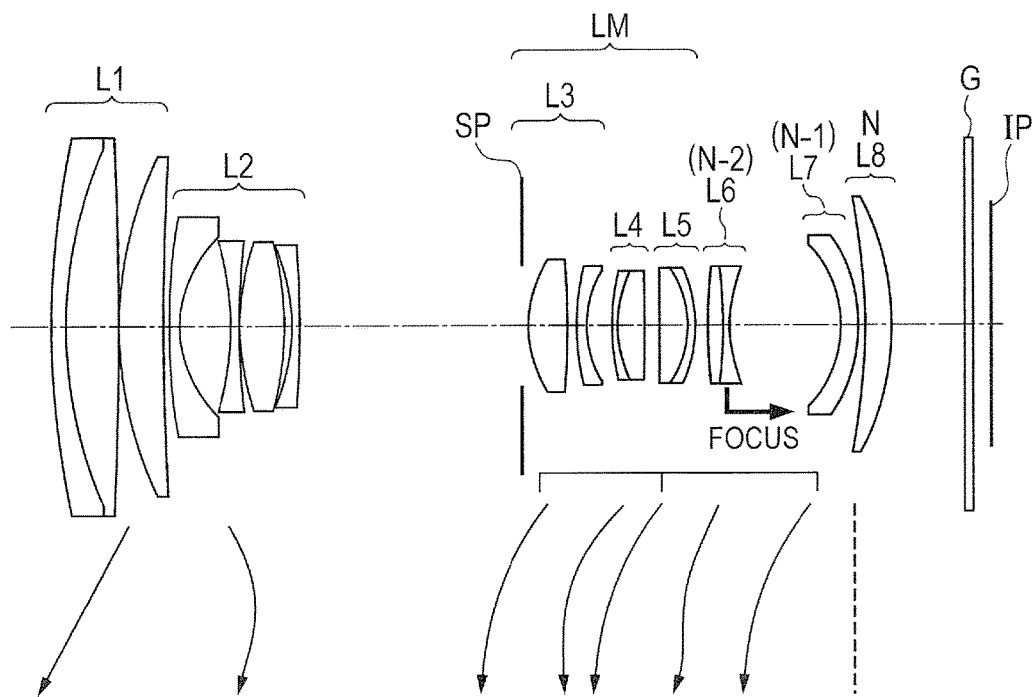
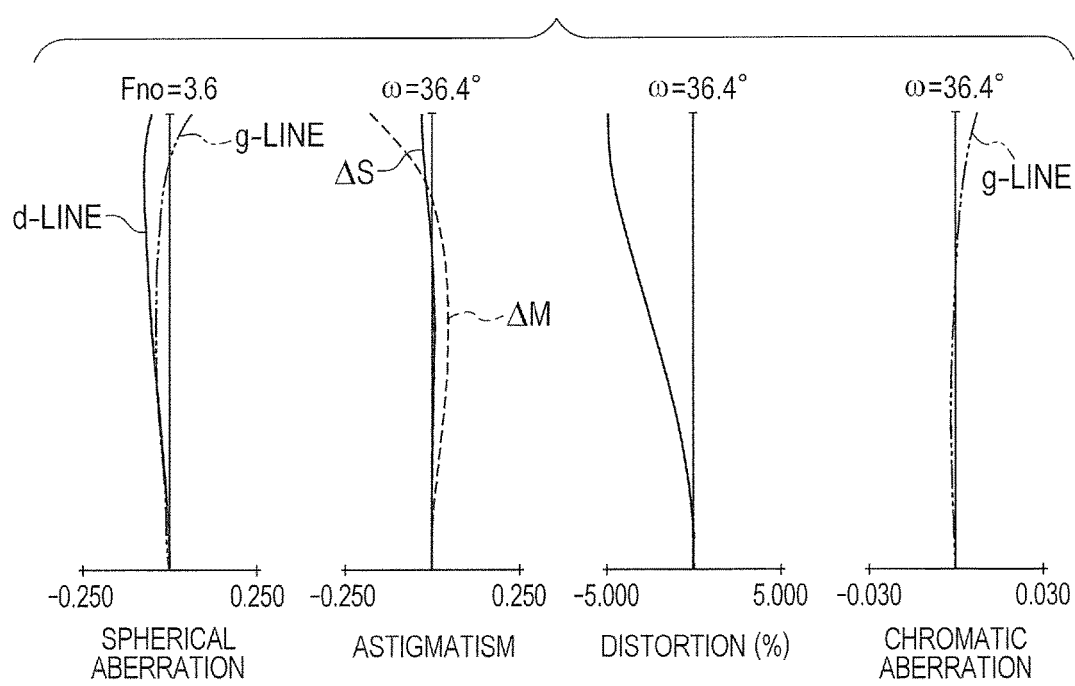

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, and is suitable as an image pickup optical system for an image pickup apparatus such as a digital camera, a video camera, a broadcast camera, a surveillance camera, or a silver halide photography camera, for example.

Description of the Related Art

There is a demand that a zoom lens as an image pickup optical system for use in an image pickup apparatus should have a high zoom ratio, high optical performance over the entire zoom range, and a short total lens length. Moreover, a focus lens unit is required to be small and light in weight for quick focusing.

U.S. Pat. No. 8,537,249 discloses a zoom lens that includes, in order from an object side to an image side, first to sixth lens units respectively having positive, negative, positive, negative, negative, and positive refractive powers, and performs focusing by moving the fourth lens unit. If a distance between the fourth lens unit and the fifth lens unit at a telephoto end is short, a space for moving the fourth lens unit toward the image side during focusing from infinity to a close distance is so small that it is difficult to perform focusing in a wide range of distance to an object.

U.S. Pat. No. 7,535,657 discloses a mirror-less type zoom lens. However, both the last lens unit having a negative refractive power and a lens unit being next to the last lens unit on the object side and having a positive refractive power have too high refractive powers, which makes it difficult to obtain high optical performance over the entire zoom range.

U.S. Pat. No. 8,736,968 discloses a rear-focus type zoom lens. However, it is difficult to shorten the total lens length because of a long backfocus.

SUMMARY OF THE INVENTION

A zoom lens according to the present invention comprises, in order from an object side to an image side, a first lens unit having a positive refractive power, a second lens unit having a negative refractive power, a middle lens group including at least one lens unit, an N minus second lens unit having a negative refractive power, an N minus first lens unit having a negative refractive power, and an Nth lens unit having a positive refractive power, where N is an integer of six or more, in which distances between the adjacent lens units change during zooming, the first lens unit moves toward the object side during zooming from a wide-angle end to a telephoto end, the N minus second lens unit moves during focusing, and the following conditional expressions are satisfied:

$8.0 < Dw/skw < 20.0$; and $0.8 < \beta np < 3.0$, where Dw represents a total lens length at the wide-angle end, skw represents a backfocus at the wide-angle end, and βnp represents a lateral magnification of a combined system of the N minus first lens unit and the Nth lens unit at the wide-angle end.

Further features of the present invention will become apparent from the following description of exemplary embodiments with reference to the attached drawings.

BRIEF DESCRIPTION OF THE DRAWINGS

FIG. 1 is a lens cross sectional view of a zoom lens at a wide-angle end according to Embodiment 1 of the present invention.

FIG. 2A is an aberration diagram of the zoom lens at the wide-angle end according to Embodiment 1 of the present invention.

DESCRIPTION OF THE EMBODIMENTS

Preferred embodiments of the present invention will now be described in detail in accordance with the accompanying drawings. A zoom lens of the present invention includes N lens units (N is an integer of six or more), and distances between the adjacent lens units during zooming change.

The zoom lens includes, in order from an object side to an image side, a first lens unit having a positive refractive power, a second lens unit having a negative refractive power, a middle lens group including at least one lens unit, an N minus second lens unit having a negative refractive power, an N minus first lens unit having a negative refractive power, and an Nth lens unit having a positive refractive power. The first lens unit moves toward the object side during zooming from the wide-angle end to the telephoto end, and the N minus second lens unit moves during focusing. The Nth lens unit does not move or moves during zooming.

Figure 2B:
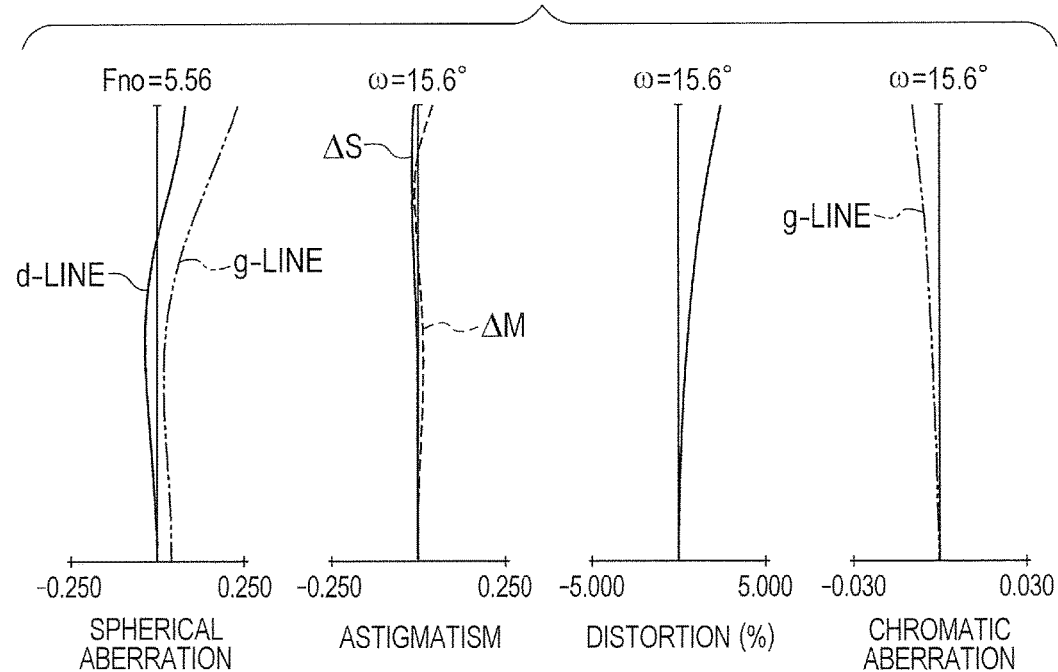
FIG. 2B is an aberration diagram of the zoom lens at a middle zoom position according to Embodiment 1 of the present invention.
Figure 2C:
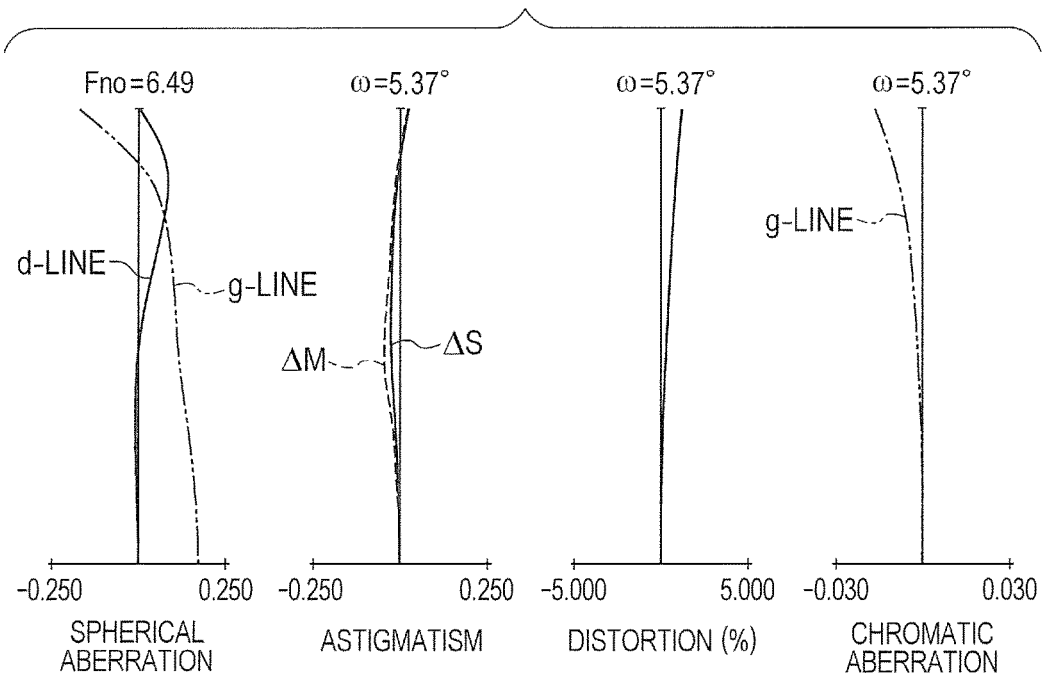
FIG. 2C is an aberration diagram of the zoom lens at a telephoto end according to Embodiment 1 of the present invention.
Figure 3:
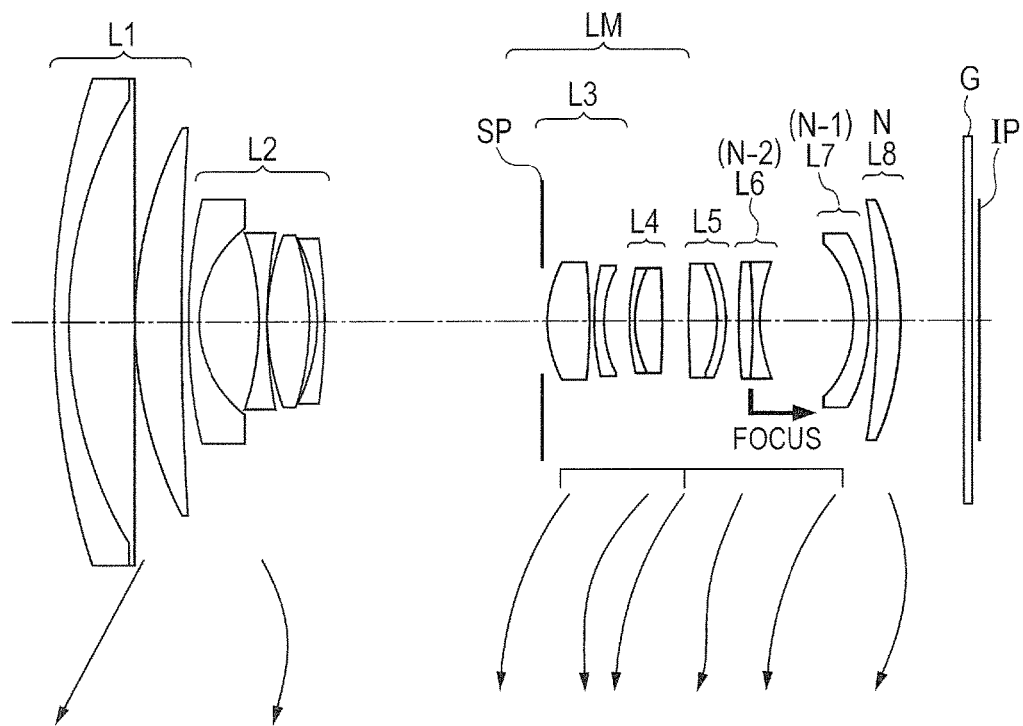
FIG. 3 is a lens cross sectional view of a zoom lens at the wide-angle end according to Embodiment 2 of the present invention.
Figure 4A:
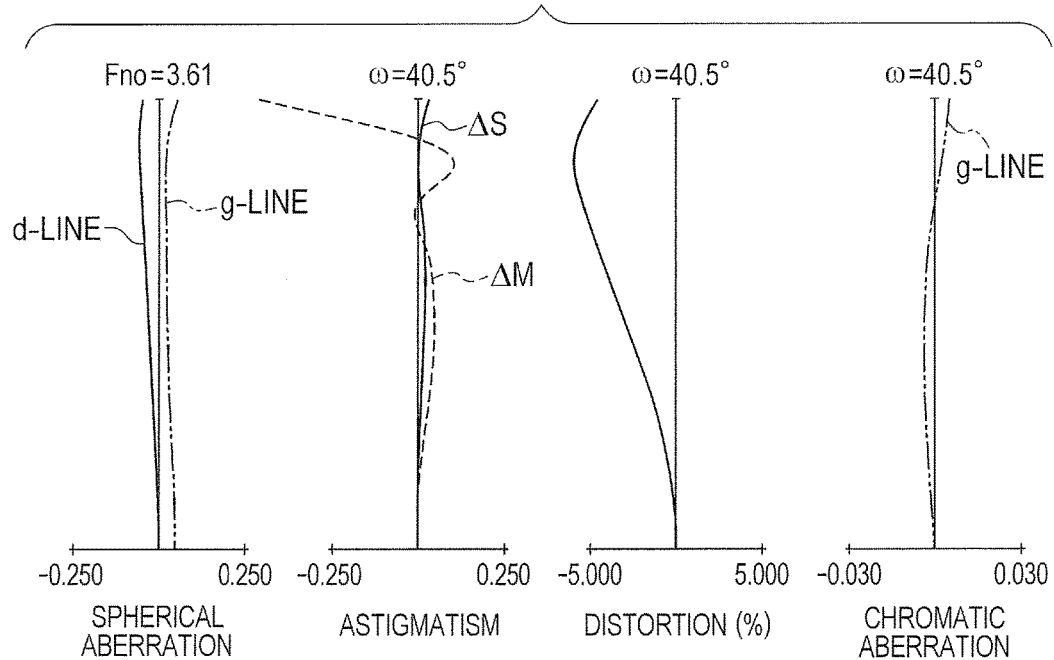
FIG. 4A is an aberration diagram of the zoom lens at the wide-angle end according to Embodiment 2 of the present invention.
Figure 4B:
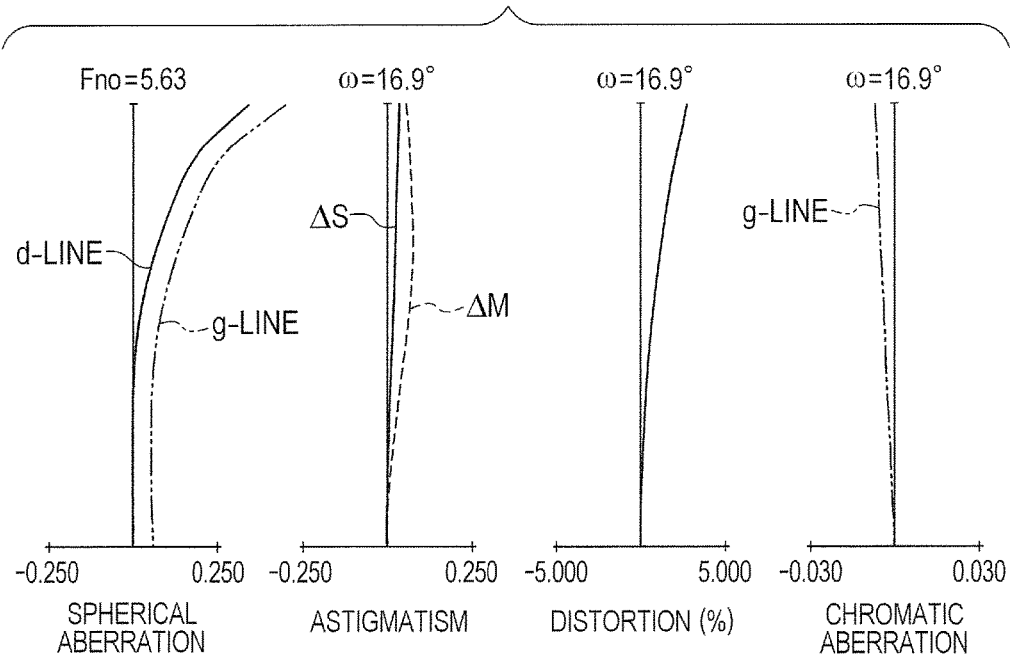
FIG. 4B is an aberration diagram of the zoom lens at the middle zoom position according to Embodiment 2 the present invention.
Figure 4C:
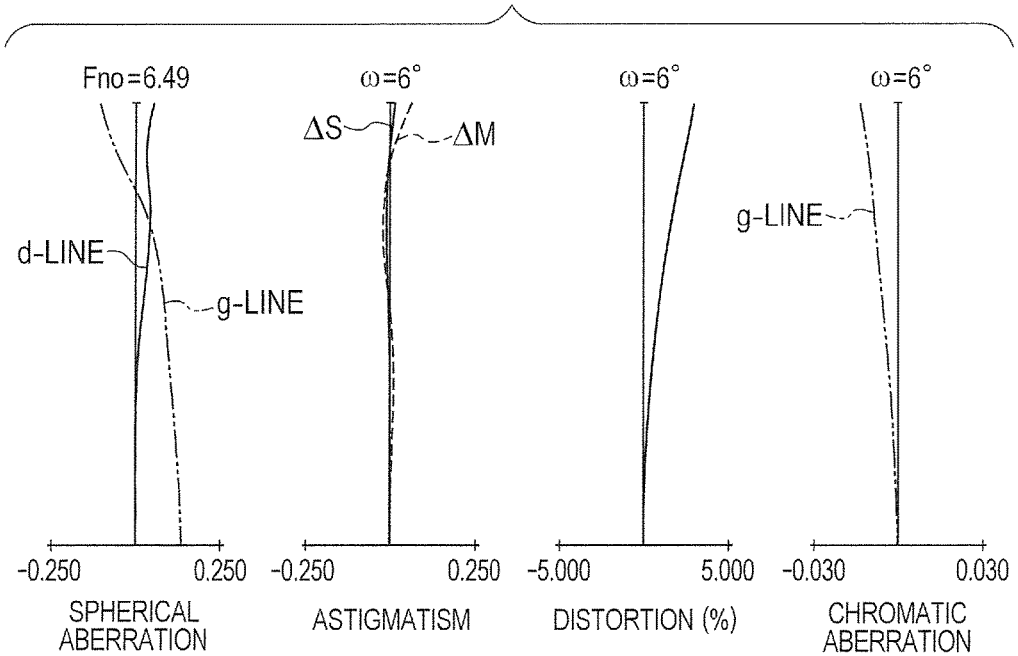
FIG. 4C is an aberration diagram of the zoom lens at the telephoto end according to Embodiment 2 of the present invention.

FIG. 1 is a lens cross sectional view of the zoom lens according to Embodiment 1 of the present invention. FIGS. 2A, 2B, and 2C are longitudinal aberration diagrams of the zoom lens of Embodiment 1 at the wide-angle end, a middle zoom position, and the telephoto end, respectively. Embodiment 1 is a zoom lens of a zoom ratio of 7.83 and an F-number of 3.60 to 6.49. FIG. 3 is a lens cross sectional view of the zoom lens according to Embodiment 2 of the present invention. FIGS. 4A, 4B, and 4C are longitudinal aberration diagrams of a zoom lens of Embodiment 2 at the wide-angle end, the middle zoom position, and the telephoto end, respectively. Embodiment 2 is a zoom lens of a zoom ratio of 8.12 and an F-number of 3.61 to 6.49.

Figure 5:
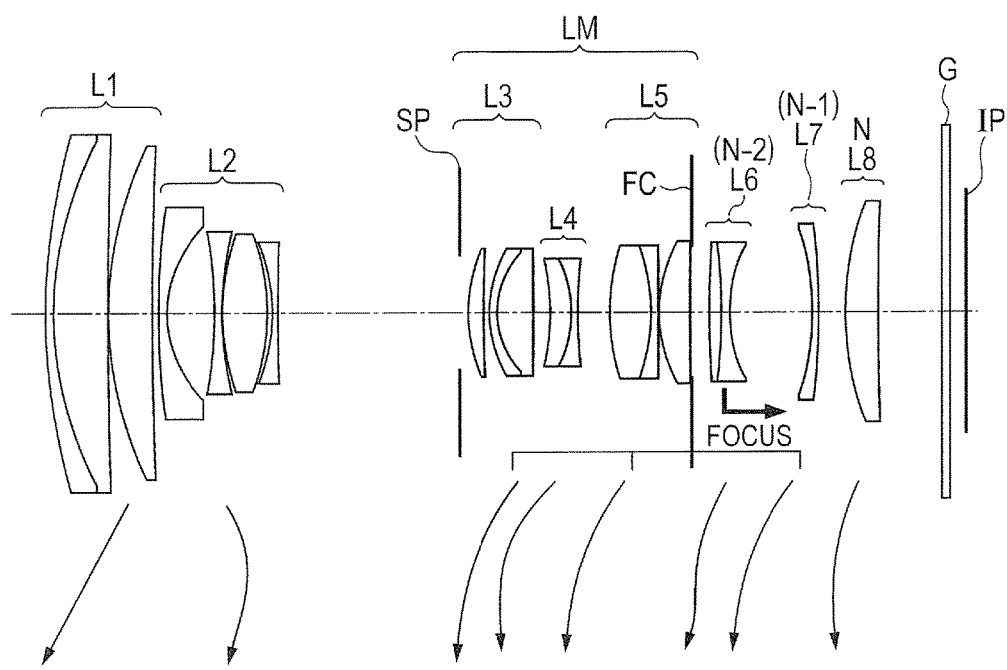
FIG. 5 is a lens cross sectional view of a zoom lens at the wide-angle end according to Embodiment 3 of the present invention.
Figure 6A:
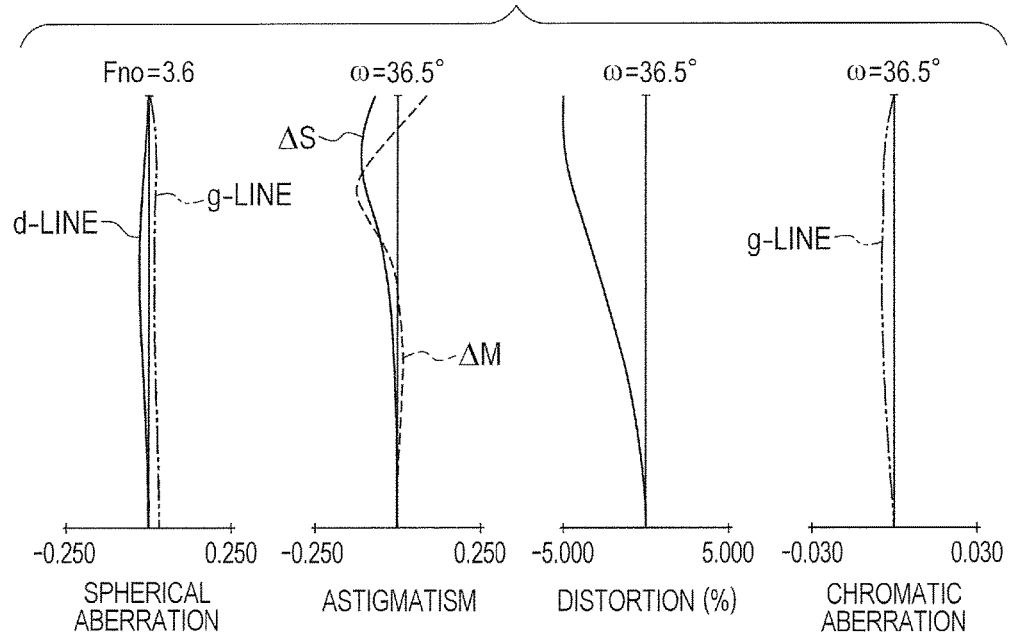
FIG. 6A is an aberration diagram of the zoom lens at the wide-angle end according to Embodiment 3 of the present invention.
Figure 6B:
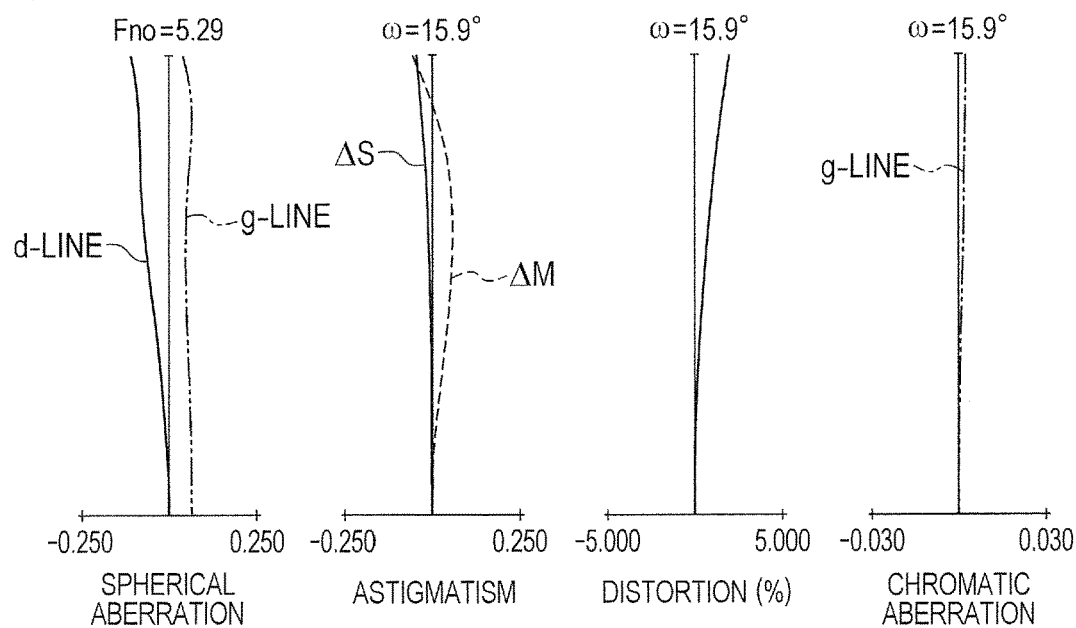
FIG. 6B is an aberration diagram of the zoom lens at the middle zoom position according to Embodiment 3 of the present invention.
Figure 6C:
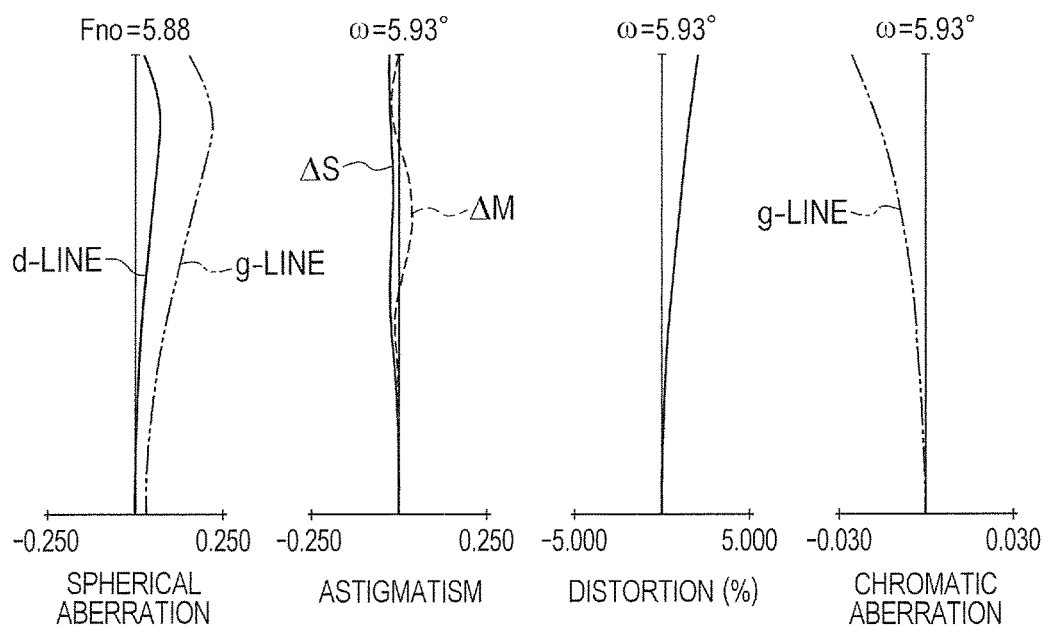
FIG. 6C is an aberration diagram of the zoom lens at the telephoto end according to Embodiment 3 the present invention.
Figure 7:
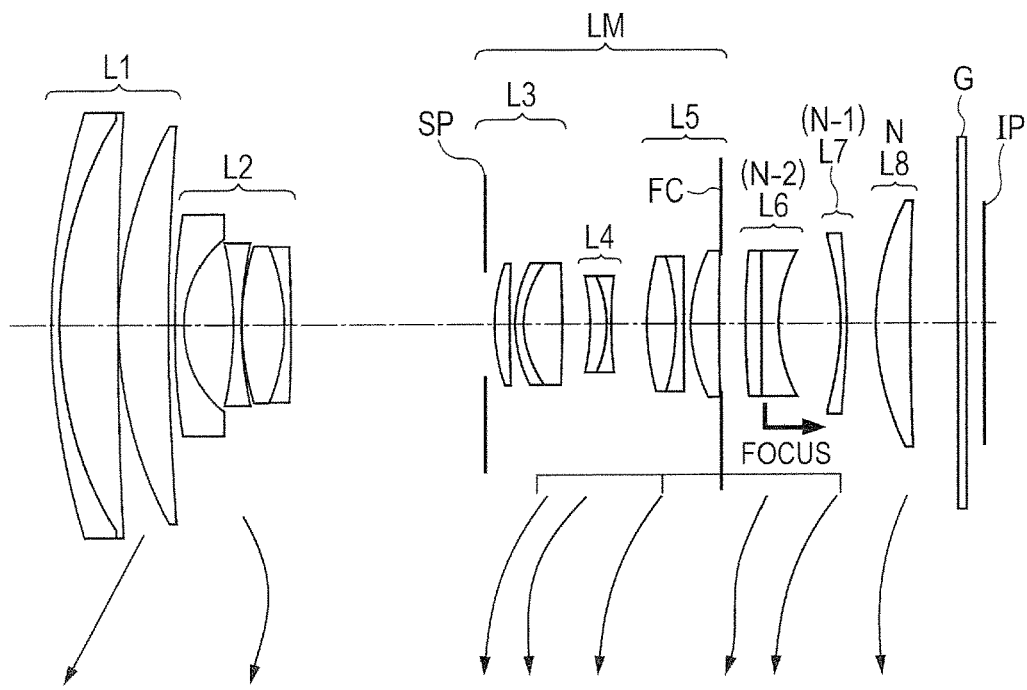
FIG. 7 is a lens cross sectional view of a zoom lens at the wide-angle end according to Embodiment 4 of the present invention.
Figure 8A:
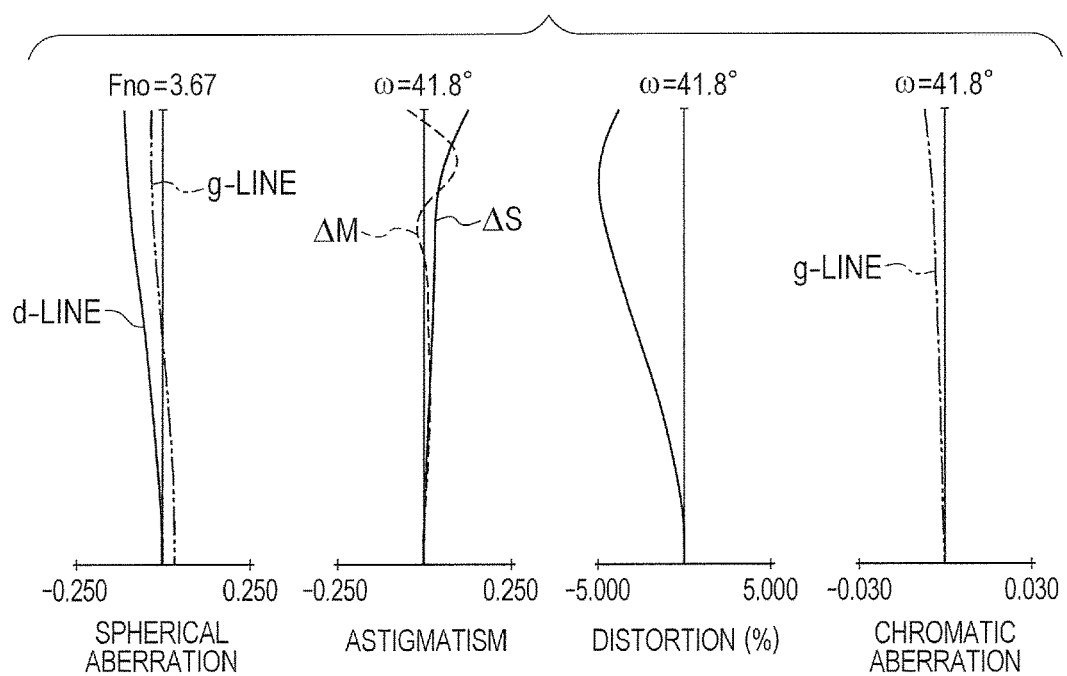
FIG. 8A is an aberration diagram of the zoom lens at the wide-angle end according to Embodiment 4 of the present invention.
Figure 8B:
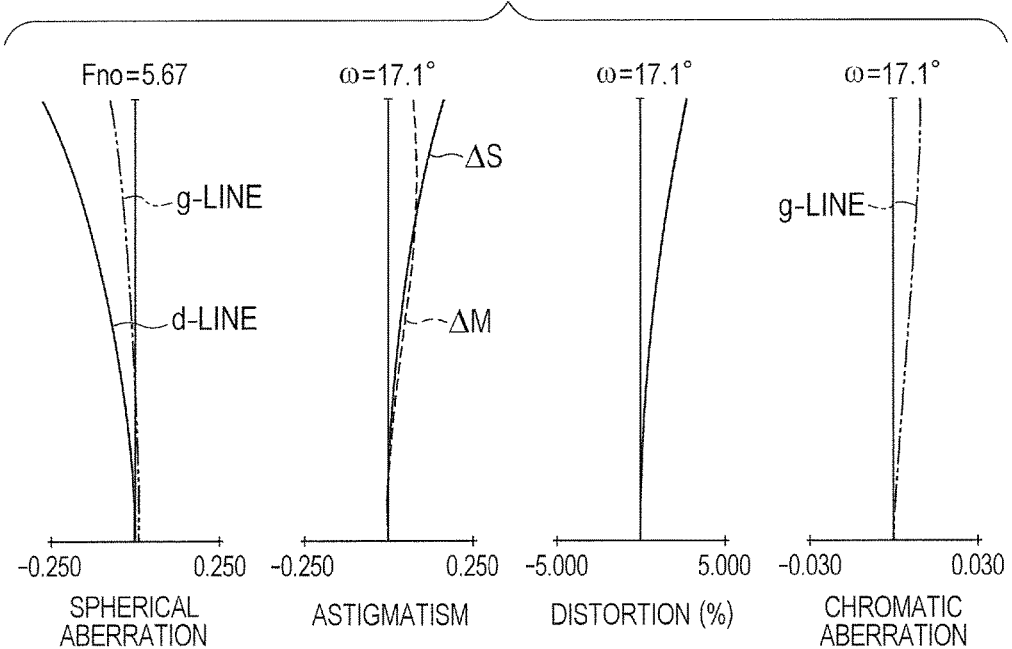
FIG. 8B is an aberration diagram of the zoom lens at the middle zoom position according to Embodiment 4 of the present invention.
Figure 8C:
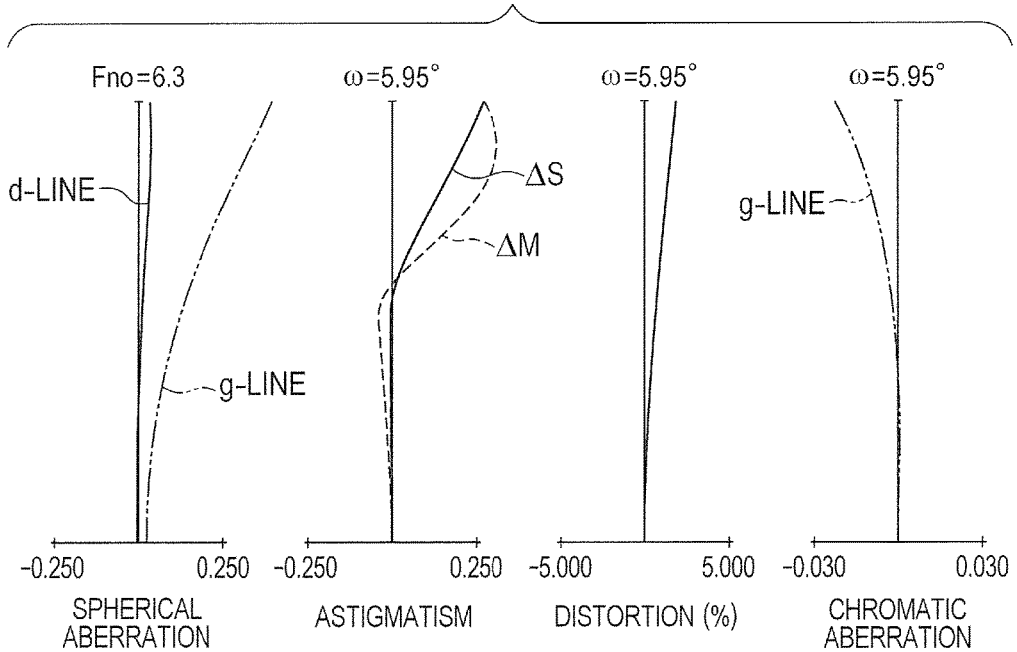
FIG. 8C is an aberration diagram of the zoom lens at the telephoto end according to Embodiment 4 the present invention.

FIG. 5 is a lens cross sectional view of the zoom lens according to Embodiment 3 of the present invention. FIGS. 6A, 6B, and 6C are longitudinal aberration diagrams of a zoom lens of Embodiment 3 at the wide-angle end, the middle zoom position, and the telephoto end, respectively. Embodiment 3 is a zoom lens of a zoom ratio of 7.11 and an F-number of 3.60 to 5.88. FIG. 7 is a lens cross sectional view of the zoom lens according to Embodiment 4 of the present invention. FIGS. 8A, 8B, and 8C are longitudinal aberration diagrams of a zoom lens of Embodiment 4 at the wide-angle end, the middle zoom position, and the telephoto end, respectively. Embodiment 4 is a zoom lens of a zoom ratio of 8.57 and an F-number of 3.67 to 6.30.

Figure 9:
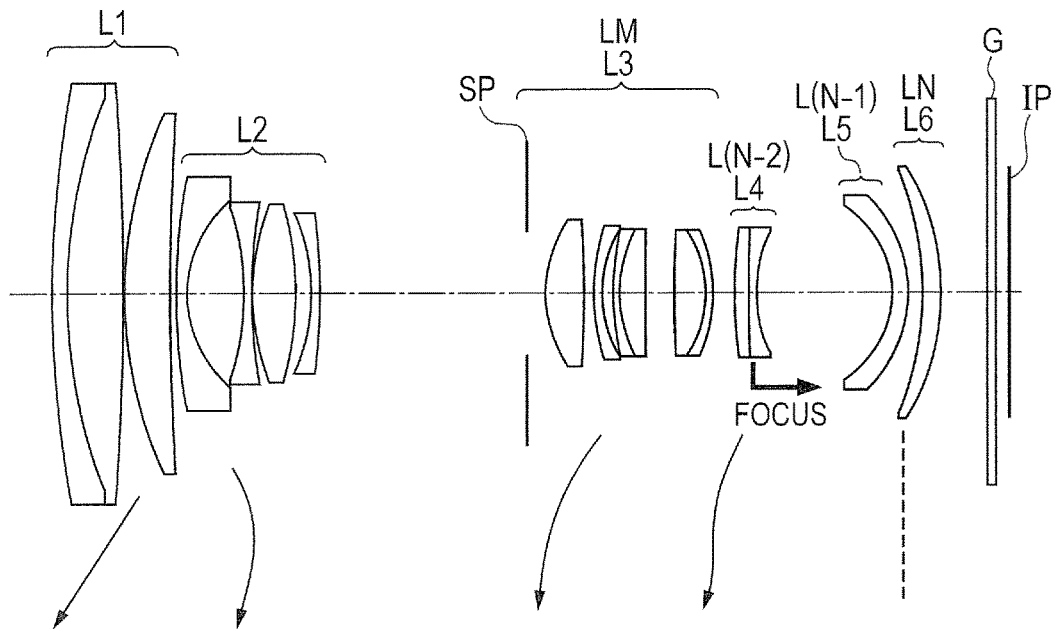
FIG. 9 is a lens cross sectional view of a zoom lens at the wide-angle end according to Embodiment 5 of the present invention.
Figure 10A:
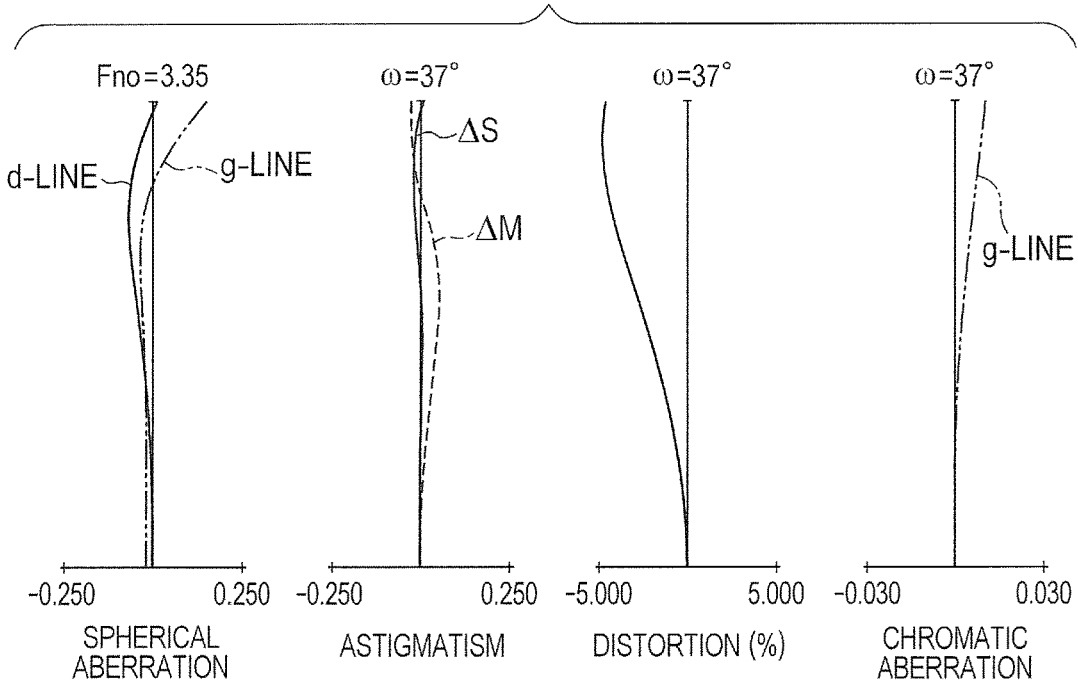
FIG. 10A is an aberration diagram of the zoom lens at the wide-angle end according to Embodiment 5 of the present invention.
Figure 10B:
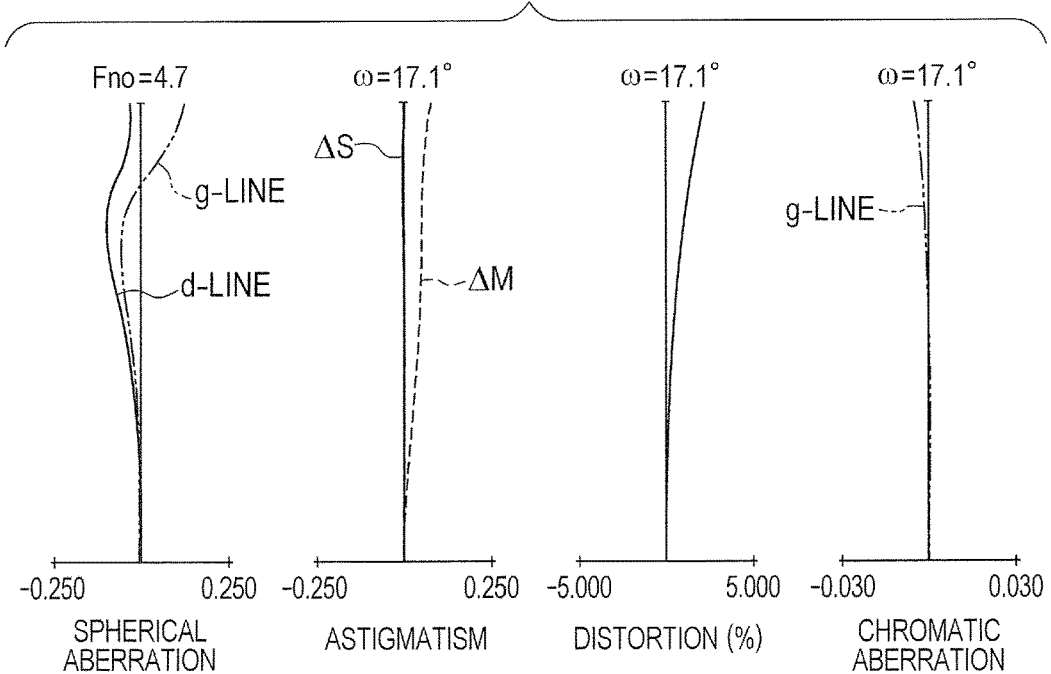
FIG. 10B is an aberration diagram of the zoom lens at the middle zoom position according to Embodiment 5 of the present invention.
Figure 10C:
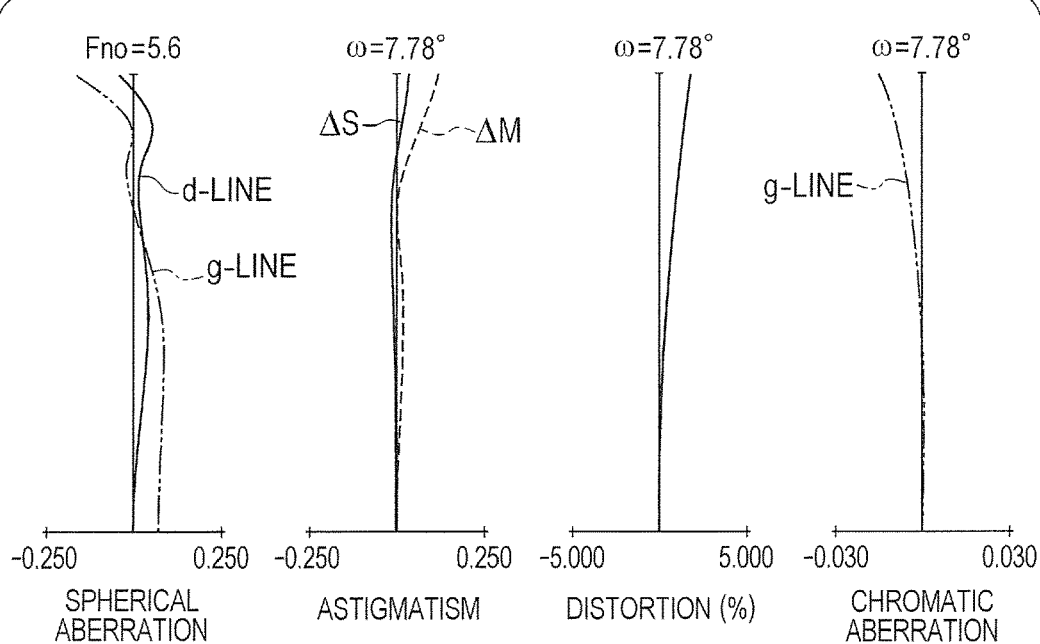
FIG. 10C is an aberration diagram of the zoom lens at the telephoto end according to Embodiment 5 the present invention.
Figure 11:
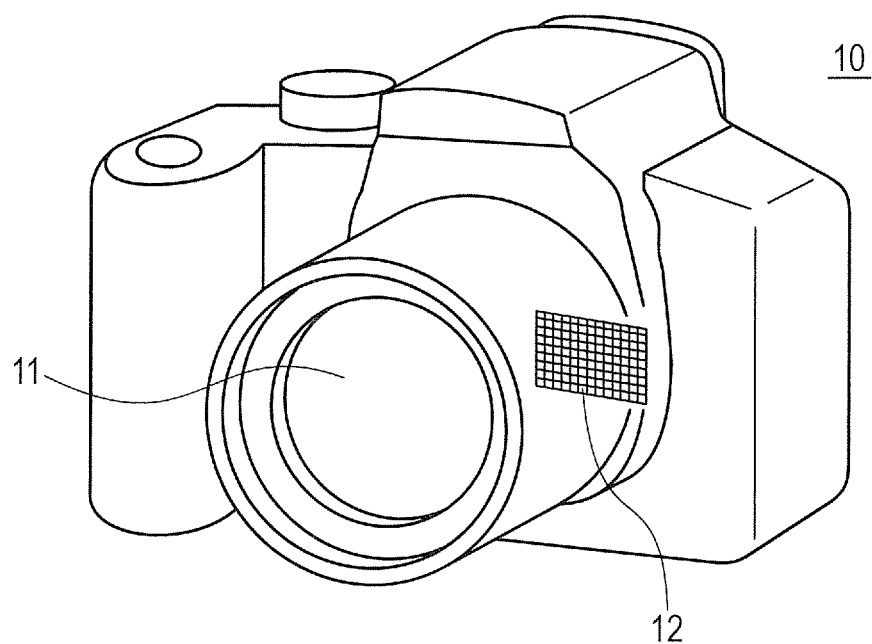
FIG. 11 is a schematic diagram of a main part of an optical device of the present invention.

FIG. 9 is a lens cross sectional view of the zoom lens according to Embodiment 5 of the present invention. FIGS. 10A, 10B, and 10C are longitudinal aberration diagrams of a zoom lens of Embodiment 5 at the wide-angle end, the middle zoom position, and the telephoto end, respectively. Embodiment 5 is a zoom lens of a zoom ratio of 5.52 and an F-number of 3.35 to 5.60. FIG. 11 is a schematic diagram of a main part of an image pickup apparatus of the present invention.

The zoom lenses of Embodiments are zoom lenses for use in image pickup apparatuses such as digital cameras, video cameras, broadcast cameras, surveillance cameras, and silver halide photography cameras. In addition, the zoom lenses of Embodiments can be used as projection optical systems for projectors. In the lens cross sectional views, the left side is the object side (front side) and the right side is the image side (rear side). In addition, in the lens cross sectional views, and Li indicates an ith lens unit, where i is an ordinal number of a lens unit counted from the object side.

LM is the middle lens group including at least one lens unit. Provided that N is an integer of six or more, (N−2) is the N minus second lens unit having the negative refractive power. (N−1) is the N minus first lens unit having the negative refractive power. N is the Nth lens unit having the positive refractive power.

SP is an aperture stop. IP is an image plane. In the case where the zoom lens is used in an image pickup apparatus such as a digital camera or video camera, the image plane IP is equivalent to an imaging plane of a solid-state image pickup element (photoelectric conversion element) such as a CCD sensor or CMOS sensor. In the case where the zoom lens is used in an image pickup apparatus such as a silver-halide film camera, the image plane IP is equivalent to a film plane. The lens units are moved as indicated by arrows during zooming from the wide-angle end to the telephoto end.

An arrow associated with FOCUS indicates a movement direction of the N minus second lens unit during focusing from an infinite distance object to a close distance object. In the spherical aberration diagram, Fno indicates an F-number, a solid line d is d-line (a wavelength of 587.6 nm), and a two-dot chain line g is g-line (wavelength 435.8 nm). In the astigmatism diagram, a dotted line ΔM is a meridional image plane of the d-line, and a solid line ΔS is a sagittal image plane of the d-line. In the distortion diagram, the distortion is presented for d-line. In the lateral chromatic aberration diagram, the lateral chromatic aberration is presented for the g-line, and ω is a half angle of view (degrees).

In Embodiments 1 and 2, the middle lens group LM includes, in order from the object side to the image side, a third lens unit having a positive refractive power, a fourth lens unit having a positive refractive power, and a fifth lens unit having a positive refractive power. In Embodiments 3 and 4, the middle lens group LM includes, in order from the object side to the image side, a third lens unit having a positive refractive power, a fourth lens unit having a negative refractive power, and a fifth lens unit having a positive refractive power. In Embodiment 5, the middle lens group LM includes a third lens unit having a positive refractive power.

Next, the lens configurations of Embodiments will be described. Embodiment 1 is an eight-unit zoom lens including, in order from the object side to the image side, first to eighth lens units L1 to L8 having positive, negative, positive, positive, positive, negative, negative, and positive refractive powers. The middle lens group LM includes the third lens unit L3, the fourth lens unit L4, and the fifth lens unit L5. The N minus second lens unit (N−2) corresponds to the sixth lens unit L6, the N minus first lens unit (N−1) corresponds to the seventh lens unit L7, and the Nth lens unit N corresponds to the eighth lens unit L8.

During zooming from the wide-angle end to the telephoto end, the first lens unit L1 moves toward the object side along a linear locus. The second lens unit L2 moves along a locus convex to the image side. The third lens unit L3, the fifth lens unit L5, and the seventh lens unit L7 move toward the object side in a unified manner (along the same loci). The fourth lens unit L4 moves toward the object side. The sixth lens unit L6 moves toward the object side. The eighth lens unit L8 does not move during zooming. The sixth lens unit L6 moves during focusing.

Embodiment 2 is an eight-unit zoom lens of the same zoom type (the number of lens units and the signs of refractive powers of the lens units) as in Embodiment 1. The middle lens group LM includes the third lens unit L3, the fourth lens unit L4, and the fifth lens unit L5. The N minus second lens unit (N−2) corresponds to the sixth lens unit L6, the N minus first lens unit (N−1) corresponds to the seventh lens unit L7, and the Nth lens unit N corresponds to the eighth lens unit L8. During zooming from the wide-angle end to the telephoto end, the movement directions of the first to seventh lens units L1 to L7 are the same as in Embodiment 1. The eighth lens unit L8 moves along a locus convex to the image side. The focusing is the same as in Embodiment 1.

Embodiment 3 is an eight-unit zoom lens including, in order from the object side to the image side, first to eighth lens units L1 to L8 having positive, negative, positive, negative, positive, negative, negative, and positive refractive powers, respectively. The middle lens group LM includes the third lens unit L3, the fourth lens unit L4, and the fifth lens unit L5. The N minus second lens unit (N−2) corresponds to the sixth lens unit L6, the N minus first lens unit (N−1) corresponds to the seventh lens unit L7, and the Nth lens unit N corresponds to the eighth lens unit L8.

During zooming from the wide-angle end to the telephoto end, the first lens unit L1 moves toward the object side. The second lens unit L2 moves along a locus convex to the image side. The third lens unit L3, the fifth lens unit L5, and the seventh lens unit L7 move toward the object side in a unified manner. The fourth lens unit L4, the sixth lens unit L6, and the eighth lens unit L8 move toward the object side. The focusing is the same as in Embodiment 1.

Embodiment 4 is an eight-unit zoom lens of the same zoom type as in Embodiment 3. The movements of all the lens units during zooming are the same as in Embodiment 3. The focusing is the same as in Embodiment 1. Embodiment 5 is a six-unit zoom lens including, in order from the object side to the image side, first to sixth lens units L1 to L6 having positive, negative, positive, negative, negative, and positive refractive powers. The middle lens group LM includes the third lens unit L3. The N minus second lens unit (N−2) corresponds to the fourth lens unit L4, the N minus first lens unit (N−1) corresponds to the fifth lens unit L5, and the Nth lens unit N corresponds to the sixth lens unit L6.

During zooming from the wide-angle end to the telephoto end, the first lens unit L1 moves toward the object side. The second lens unit L2 moves along a locus convex to the image side. The third to fifth lens units L3 to L5 move toward the object side independently of each other (along different loci from each other). The sixth lens unit L6 does not move during zooming. The fourth lens unit L4 moves during focusing.

The zoom lenses of Embodiments vary the magnification during zooming mainly by moving the first lens unit L1, the second lens unit L2, and the third lens unit L3. The first lens unit L1 moves toward the object side during zooming from the wide-angle end to the telephoto end, which makes it possible to achieve a small front lens effective diameter at the wide-angle end and a high zoom ratio. The third lens unit L3 moves toward the object side during zooming from the wide-angle end to the telephoto end, thereby obtaining a magnification varying effect. During focusing from infinity to a close distance, the N minus second lens unit (N−2) moves toward the image side as illustrated by the arrow.

In the zoom lenses of Embodiments, the N minus second lens unit (N−2) moves during focusing. The N minus first lens unit (N−1) has a negative refractive power, and the Nth lens unit N has a positive refractive power.

In order to shorten the total lens length of the positive-lead type zoom lens, it is effective to arrange a lens unit having a strong negative refractive power near the last lens unit, and to arrange a lens unit having a strong positive refractive power in the rear of the former lens unit. In addition, in order to shorten the total lens length by effectively utilizing the length of the backfocus, it is effective to arrange a lens unit having a negative refractive power and a lens unit having a positive refractive power near the image plane in order from the object side to the image side. If the last lens unit is set to have a positive refractive power, an incident angle of light rays onto the image plane can be made low, and thereby can reduce the occurrence of so-called shading, that is, light falloff or coloring in peripheral image heights on the image pickup element.

In addition, each of the N minus second lens unit (N−2) and the N minus first lens unit (N−1) is set to have a negative refractive power, so that the negative refractive power is distributed to these two lens units, and the N minus second lens unit (N−2) is moved during focusing. This configuration enables a reduction in the effective diameter of the N minus second lens unit (N−2) for focusing. Moreover, the refractive power of the N minus second lens unit (N−2) is set appropriately, so that the focus sensitivity, which is sensitivity of a movement amount of a focal plane relative to a movement of the N minus second lens unit (N−2), is made appropriate.

This configuration suppresses the movement amount during focusing and increases the flexibility in layout of mechanical members, thereby achieving a reduction in the lens barrel diameter. Moreover, the N minus second lens unit (N−2) and the N minus first lens unit (N−1) move during zooming along different loci independent of each other, and thereby reduce variations in optical performance in a zoom middle range.

It is preferable that each of Embodiments satisfies at least one of the following conditional expressions:

$$8.0 < Dw/skw < 20.0 \tag{1}$$

$$0.8 < \beta np < 3.0 \tag{2}$$

$$0.1 < f(N-2)/f(N-1) < 2.0 \tag{3}$$

$$-10.0 < (1-\beta f^2) \times \beta rt^2 < -3.0 \tag{4}$$

$$3.0 < fN/skw < 40.0 \tag{5}$$

$$-5.0 < f(N-2)/fw < -1.0 \tag{6}$$

$$2.0 < f1/fw < 8.0 \tag{7}$$

$$-4.0 < POw/fw < -1.0 \tag{8}$$

$$2.5 < ft/fw < 50.0 \tag{9}$$

$$0.3 < |m(N-2)mid/m(N-1)mid| < 1.5 \tag{10); and}$$

$$-7.0 < m1/fw < -1.0 \tag{11}$$

where Dw is a total lens length at the wide-angle end, skw is a backfocus at the wide-angle end, βnp is a lateral magnification of a combined system of the N minus first lens unit (N−1) and the Nth lens unit N at the wide-angle end, f(N−2) is a focal length of the N minus second lens unit (N−2), f(N−1) is a focal length of the N minus first lens unit (N−1), βf is a lateral magnification of the N minus second lens unit (N−2) at the telephoto end, βrt is a lateral magnification of the combined system of the N minus first lens unit (N−1) and the Nth lens unit N at the telephoto end, fN is a focal length of the Nth lens unit N, fw is a focal length of the zoom lens at the wide-angle end, f1 is a focal length of the first lens unit L1, POw is a distance from the image plane to the exit pupil position at the wide-angle end, ft is a focal length of the zoom lens at the telephoto end, fM is a focal length of the zoom lens at the middle zoom position and is defined as fM=√(fw×ft), m(N−2)mid is a movement amount of the N minus second lens unit (N−2) during zooming from the wide-angle end to the middle zoom position, m(N−1)mid is a movement amount of the N minus first lens unit (N−1) during zooming from the wide-angle end to the middle zoom position, and m1 is a movement amount of the first lens unit L1 during zooming from the wide-angle end to the telephoto end.

Here, the total lens length is a length defined as a sum of a distance from the first lens surface on the object side to the last lens surface and an air-equivalent backfocus. The backfocus is a length in air from the last lens surface to the image plane. The exit pupil position is expressed by a distance from the image plane. The exit pupil position on the object side of the image plane is expressed by a distance with a negative sign, and the exit pupil position on the image side of the image plane is expressed by a distance with a positive sign. Then, the movement amount of the lens unit is equivalent to a distance between the position of the lens unit on the optical axis at the wide-angle end and the position of the lens unit on the optical axis at the telephoto end, and the sign of the movement amount is positive for the case where the lens unit is closer to the image side at the telephoto end than at the wide-angle end, and is negative for the case where the lens unit is closer to the object side at the telephoto end than at the wide-angle end.

Hereinafter, technical meanings of the above-listed conditional expressions will be described. The conditional expression (1) is intended to shorten the total lens length at the wide-angle end and to reduce the lens effective diameter of the focus lens unit. If the total lens length Dw becomes too long and the ratio exceeds the upper limit of the conditional expression (1), it is difficult to downsize the zoom lens. Meanwhile, if the backfocus skw becomes too short, the positive refractive power of the last lens unit (Nth lens unit) needs to be increased to suppress an increase in the incident angle of light rays onto the image plane. This case is not preferred because the optical performance are deteriorated, and a space for inserting a protective glass for an image pickup element and various kinds of filters is narrowed.

If the total lens length Dw becomes too short and the ratio falls below the lower limit of the conditional expression (1), the refractive powers of the lens units need to be increased. As a result, it is difficult to keep high optical performance in the entire zoom range. Meanwhile, if the backfocus skw becomes too long, the total size of the zoom lens is increased, which is unfavorable.

The conditional expression (2) specifies the lateral magnification βnp of the combined system of the N minus first lens unit (N−1) and the Nth lens unit N at the wide-angle end in order to set appropriate sensitivity of the focus lens unit. If the lateral magnification βnp of the combined system becomes too high and exceeds the upper limit of the conditional expression (2), the focus sensitivity of the focus lens unit becomes too high, which makes mechanical control for focusing difficult. If the lateral magnification βnp of the combined system becomes too low and falls below the lower limit of the conditional expression (2), the focus sensitivity of the focus lens unit tends to be low, which is unfavorable because the optical performance at a close distance are deteriorated and the focus lens unit is increased in length in the optical axis direction.

The conditional expression (3) specifies a ratio of the focal length of the N minus second lens unit (N−2), which is the focus lens unit, to the focal length of the N minus first lens unit (N−1) following the N minus second lens unit (N−2) in order to obtain high optical performance over the entire object distance range.

If the focal length of the focus lens unit becomes too long and the ratio exceeds to the upper limit of the conditional expression (3), the focus sensitivity becomes low and the movement amount of the focus lens unit for shooting at close distance is increased. As a result, it is difficult to achieve the high optical performance for shooting at close distance. Meanwhile, if the focal length of the N minus first lens unit (N−1) becomes too short, the light rays are largely diverged near the image plane. This results in increases in the field curvature and the lateral chromatic aberration, and makes it difficult to correct these aberrations.

If the focal length of the focus lens unit becomes too short and the ratio falls below the lower limit of the conditional expression (3), the refractive power of the focus lens unit is too strong, and it is difficult to achieve the high optical performance at close distance. Meanwhile, if the focal length of the N minus first lens unit (N−1) is too long, even the configuration in which the negative refractive power and the positive refractive power are arranged immediately in front of the image plane has difficulty in shortening the total lens length.

The conditional expression (4) specifies the lateral magnification βf of the N minus second lens unit (N−2) at the telephoto end and the lateral magnification βrt of the combined system of the Nth lens unit N and the N minus first lens unit (N−1) at the telephoto end in order to obtain the high optical performance at the telephoto end over the entire object distance range. The conditional expression (4) expresses the focus sensitivity at the telephoto end.

If the focus sensitivity becomes too high and exceeds the upper limit of the conditional expression (4), it is difficult to mechanically control the focus lens unit with high accuracy. In addition, the refractive power of the focus lens unit tends to be strong, which makes it difficult to obtain the high optical performance in shooting at close distance. Meanwhile, if the focus sensitivity becomes too weak and falls below the lower limit of the conditional expression (4), the movement amount of the focus lens unit during focusing is increased and accordingly the total lens length is increased. This is unfavorable because the total size of the zoom lens is increased.

The conditional expression (5) specifies a ratio of the focal length of the Nth lens unit N to the backfocus at the wide-angle end in order to shorten the total lens length and obtain good telecentricity. If the focal length of the Nth lens unit N becomes too long and the ratio exceeds the upper limit of the conditional expression (5), it is difficult to shorten the total lens length. Moreover, this case is also unfavorable because the incident angle of the light rays entering the peripheral image height becomes large to cause heavy shading. Instead, if the backfocus becomes too short, it is difficult to insert a protective glass and various kinds of filters in front of the image plane.

If the focal length of the Nth lens unit N becomes too short and the ratio falls below the lower limit of the conditional expression (5), the Nth lens unit N bends light rays too strongly. In this case, the field curvature in the entire zoom range is increased, and this aberration is difficult to suppress. Meanwhile, if the backfocus becomes too long, this is unfavorable because the total size of the zoom lens is increased.

The conditional expression (6) specifies a ratio of the focal length of the N minus second lens unit (N−2), which is the focus lens unit, to the focal length of the zoom lens at the wide-angle end in order to obtain the high optical performance over the entire object distance range and shorten the total lens length. If the focal length of the focus lens unit becomes too long and the ratio exceed the upper limit of the conditional expression (6), the refractive power of the focus lens unit is weak. This requires an increase in the movement amount during focusing, and makes it difficult to shorten the total lens length.

If the focal length of the focus lens unit becomes too short and the ratio falls below the lower limit of the conditional expression (6), the focus sensitivity is too high, which makes it difficult to mechanically control the driving of the focus lens unit with high accuracy.

The conditional expression (7) specifies a ratio of the focal length of the first lens unit L1 to the focal length of the zoom lens at the wide-angle end in order to obtain a high zoom ratio. If the focal length of the first lens unit L1 becomes too long and the ratio exceeds the upper limit of the conditional expression (7), a lateral chromatic aberration at the wide-angle end and an axial chromatic aberration at the telephoto end are easy to correct. However, the movement amount of the first lens unit L1 during zooming increases and the total lens length becomes long. This is unfavorable.

Meanwhile, if the focal length of the first lens unit L1 becomes too short and the ratio falls below the lower limit of the conditional expression (7), the downsizing of the zoom lens is easy, but it is difficult to correct aberrations such as a spherical aberration and a coma by using a small number of lenses. Moreover, the focal length on the wide angle side is so long that a desired zoom ratio is difficult to ensure.

The conditional expression (8) specifies a ratio of the exit pupil position at the wide-angle end to the focal length of the zoom lens at the wide-angle end in order to ensure high telecentricity. Here, the distance POw of the exit pupil position is a distance from the image plane, and the sign thereof is defined as negative if the exit pupil position is on the object side of the image plane. If the distance POw of the exit pupil position becomes too long and the ratio exceeds the upper limit of the conditional expression (8), the refractive power of the Nth lens unit N tends to be strong, which results in an increase in the field curvature and makes this aberration difficult to suppress.

If the distance POw of the exit pupil position becomes too short and the ratio falls below the lower limit of the conditional expression (8), the incident angle of light rays onto the peripheral image height is so large as to increase the occurrence of shading. In another case, the focal length of the zoom lens at the wide-angle end is so long as to make it difficult to achieve a high zoom ratio.

The conditional expression (9) is intended to achieve a high zoom ratio. If the ratio is within the range of the conditional expression (9), the zoom lens can easily achieve the high optical performance over the entire object distance range with achieving a high zoom ratio.

The conditional expression (10) specifies the movement amounts of the N minus second lens unit (N−2) and the N minus first lens unit (N−1) during zooming from the wide-angle end to the middle zoom position. If the movement amount of the N minus second lens unit (N−2) becomes too long and the ratio exceeds the upper limit of the conditional expression (10), the distances between the N minus second lens unit (N−2) and the adjacent lens units are so small as to make it difficult to mechanically arrange the lens units. If the movement amount of the N minus second lens unit (N−2) becomes too short and the ratio falls below the lower limit of the conditional expression (10), the distance to the N minus first lens unit (N−1) is so small as to make it difficult to perform focusing to a close distance object.

The conditional expression (11) specifies a ratio of the movement amount of the first lens unit L1 during zooming to the focal length of the zoom lens at the wide-angle end. If the focal length of the zoom lens at the wide-angle end becomes too long and the ratio exceeds the upper limit of the conditional expression (11), a high zoom ratio is difficult to achieve. Instead, if the movement amount of the first lens unit L1 during zooming becomes too short, the first lens unit L1 has a too strong refractive power. In this case, the spherical aberration and the coma increase so much that these aberrations are difficult to correct.

If the focal length of the zoom lens at the wide-angle end becomes too short and the ratio falls below the lower limit of conditional expression (11), this is unfavorable because the lens effective diameter of the first lens unit L1 is so large as to increase the total size of the zoom lens. Instead, if the movement amount of the first lens unit L1 during zooming becomes too long, this is also is unfavorable because the total lens length at the telephoto end is so long as to increase the total size of the zoom lens.

In Embodiments, it is preferred that the numerical value ranges of the conditional expressions (1) to (11) be set as follows:

$$8.5 < Dw/skw < 17.5 \tag{1a}$$

$$0.9 < \beta np < 2.5 \tag{2a}$$

$$0.2 < f(N-2)/f(N-1) < 1.0 \tag{3a}$$

$$-9.0 < (1-\beta f^2) \times \beta rt^2 < -3.5 \tag{4a}$$

$$4.0 < fN/skw < 30.0 \tag{5a}$$

$$-4.0 < f(N-2)/fw < -1.2 \tag{6a}$$

$$2.5 < f1/fw < 7.0 \tag{7a}$$

$$-3.5 < POw/fw < -1.2 \tag{8a}$$

$$3.0 < ft/fw < 30.0 \tag{9a}$$

$$0.5 < |m(N-2)\text{mid}/m(N-1)\text{mid}| < 1.3 \tag{10a; and}$$

$$-6.0 < m1/fw < -1.5 \tag{11a}$$

More preferably, in Embodiments, when the numerical value ranges of the conditional expressions (1a) to (11a) are set as follows, the effects produced by the requirements specified by the conditional expressions discussed above can be maximized:

$$9.0 < Dw/skw < 15.0 \tag{1b}$$

$$1.0 < \beta np < 1.5 \tag{2b}$$

$$0.35 < f(N-2)/f(N-1) < 0.80 \tag{3b}$$

$$-8.0 < (1-\beta f^2) \times \beta rt^2 < -4.0 \tag{4b}$$

$$5.0 < fN/skw < 20.0 \tag{5b}$$

$$-3.0 < f(N-2)/fw < -1.5 \tag{6b}$$

$$3.5 < f1/fw < 6.0 \tag{7b}$$

$$-3.0 < POw/fw < -1.5 \tag{8b}$$

$$5.0 < ft/fw < 10.0 \tag{9b}$$

$$0.6 < |m(N-2)\text{mid}/m(N-1)\text{mid}| < 1.0 \tag{10b; and}$$

$$-4.0 < m1/fw < -2.0 \tag{11b}$$

In Embodiments 1, 2, 3, it is preferred that the third lens unit L3 and the fifth lens unit L5 move during zooming in a unified manner along the same loci for the purpose of simplifying the mechanical structure. In addition, it is also preferred that the Nth lens unit N, that is, the last lens unit be kept unmoved during zooming for the purposes of simplifying the mechanical structure and easily imparting dust-proof and drip-proof properties to a zoom lens.

Moreover, it is desirable to make the weight of the N minus second lens unit (N−2), that is, the focus lens unit as light as possible also for speed-up of focusing. For this reason, the N minus second lens unit (N−2) is preferably formed of a single lens or a cemented lens including at most two lenses.

In addition, it is desirable that the zoom lens be downsized while achieving a high zoom ratio with a wide angle of view. In this regard, as the number of lenses in the first lens unit L1 becomes less, the incident height of off-axial rays passing through the first lens unit L1 can be lowered, and thus the effective diameter of the first lens unit L1 can be made small. For this reason, the number of lenses in the first lens unit L1 is preferably four or less in order to obtain a desirable zoom lens.

Further, the second lens unit L2 preferably includes, in order from the object side to the image side, a negative lens, a negative lens, a positive lens, and a negative lens for the purpose of achieving a wide angle of view. The lens having the positive refractive power thus arranged is used to converge light rays, which allows the following lens units to have small effective diameters. Also, the second lens unit L2 is formed to be a lens unit having a negative refractive power, and have a lens configuration where the leading lenses are negative lenses. This configuration makes it easier to achieve a wide angle of view.

Further, it is preferable to include an aspherical surface in the third lens unit L3, and to appropriately set the refractive powers of the third lens unit L3 and the following lens units and the refractive power of the second lens unit L2. This makes it possible to favorably correct off-axial aberrations such as an astigmatism and a distortion, in particular, and thereby to effectively correct the spherical aberration, the coma, and the like of the zoom lens at a high zoom ratio with a wide angle of view.

In the above Embodiments, the optical elements are configured as described above, so that the zoom lens is obtained which achieves a high zoom ratio, has a short total lens length and a small lens diameter, and has the high optical performance over the entire object distance range.

Next, with reference to FIG. 11, description will be provided for an embodiment of a digital still camera (image pickup apparatus) using a zoom lens of the present invention as an image pickup optical system. In FIG. 11, reference numeral 10 indicates a camera main body and reference numeral 11 indicates an image pickup optical system including a zoom lens of the present invention. Reference numeral 12 indicates a solid-state image pickup element (photoelectric conversion element) such as a CCD sensor or a CMOS sensor that is incorporated in the camera main body, and receives light of an image of a subject formed by the image pickup optical system 11.

Hereinafter, specific numerical value data of numerical embodiments 1 to 5 corresponding to Embodiments 1 to 5 will be presented. In each of the embodiments, i represents the ordinal number of a surface counted from the object side, ri represents the curvature radius of the i-th optical surface (the ith surface), and di represents an on-axis distance between the ith surface and the (i+1)th surface. In addition, ndi and vdi represent a refractive power and an Abbe number, respectively, of the material for an optical component located between the ith and (i+1)th surfaces with respect to the d-line. An aspherical shape is expressed by the following formula:

$$X = \frac{H^2/R}{1 + \sqrt{1 - (1+K)(H/R)^2}} + A4H^4 + A6H^6 + A8H^8 + A10H^{10},$$

where an x axis defines an optical axis direction, an H axis defines a direction perpendicular to the optical axis, a length in a light traveling direction is expressed with a positive sign, R represents a paraxial curvature radius, K represents a conic constant, and A4, A6, A8 and A10 represent aspheric coefficients. Then, * indicates a surface having an aspheric shape. In addition, "e-x" in numerical values indicates "$10^{-x}$". In the numerical value data, the last two surfaces are the surfaces of an optical block such as a filter or a face plate. BF is an air-equivalent backfocus. The total lens length is a value of a sum of the distance from the first lens surface to the last lens surface and the backfocus BF. Moreover, Table 1 presents relationships between the aforementioned conditional expressions and Embodiments.

Numerical Embodiment 1

[unit: mm]

Surface data

| Surface number | r | d | nd | vd |
|---|---|---|---|---|
| 1 | 98.040 | 1.60 | 1.91082 | 35.3 |
| 2 | 49.070 | 5.79 | 1.49700 | 81.5 |
| 3 | −423.769 | 0.15 | | |
| 4 | 45.509 | 4.82 | 1.59522 | 67.7 |
| 5 | 332.437 | (variable) | | |
| 6 | 86.952 | 1.10 | 1.95375 | 32.3 |
| 7 | 13.484 | 5.75 | | |
| 8 | −31.460 | 0.80 | 1.77250 | 49.6 |
| 9 | 70.614 | 0.15 | | |
| 10 | 28.240 | 4.95 | 1.84666 | 23.9 |
| 11 | −32.556 | 0.70 | | |
| 12 | −21.847 | 0.85 | 1.69680 | 55.5 |
| 13 | −120.000 | (variable) | | |
| 14 (stop) | ∞ | 0.70 | | |
| 15* | 13.204 | 4.34 | 1.58313 | 59.4 |
| 16* | −61.870 | 0.99 | | |
| 17 | 25.887 | 1.13 | 1.83481 | 42.7 |
| 18 | 12.752 | (variable) | | |
| 19 | 23.617 | 0.60 | 1.90366 | 31.3 |
| 20 | 12.334 | 3.07 | 1.69680 | 55.5 |
| 21 | −186.310 | (variable) | | |
| 22 | −407.535 | 3.18 | 1.51633 | 64.1 |
| 23 | −11.485 | 0.79 | 2.00069 | 25.5 |
| 24 | −16.338 | (variable) | | |
| 25 | 69.672 | 1.63 | 1.89286 | 20.4 |
| 26 | −69.673 | 0.70 | 1.74951 | 35.3 |
| 27 | 15.570 | (variable) | | |
| 28* | −13.580 | 1.80 | 1.53160 | 55.8 |
| 29* | −20.993 | (variable) | | |
| 30 | −66.048 | 2.96 | 1.76200 | 40.1 |
| 31 | −31.014 | 7.96 | | |
| 32 | ∞ | 1.00 | 1.54400 | 60.0 |
| 33 | ∞ | 2.04 | | |
| Image plane | ∞ | | | |

Aspheric surface data

15th surface

K = 0.00000e+000
A4 = −3.70870e−005

-continued

[unit: mm]

A6 = −9.06300e−008
A8 = 1.50901e−009
A10 = 8.60362e−012
16th surface

K = 0.00000e+000
A4 = 4.21568e−005
A6 = −3.28652e−008
A8 = 2.46762e−009
A10 = 5.11535e−012
28th surface K = 0.00000e+000
A4 = −4.90424e−005
A6 = −2.47272e−007
A8 = 3.25583e−009
29th surface K = 0.00000e+000
A4 = −4.47195e−005
A6 = −1.49024e−007
A8 = 2.93480e−009
A10 = −9.51658e−012

Various data
Zoom ratio 7.83

| | Wide angle | Middle | Telephoto |
|---|---|---|---|
| Focal length | 18.56 | 48.87 | 145.41 |
| F-number | 3.60 | 5.56 | 6.49 |
| Half angle of view (deg) | 36.35 | 15.62 | 5.37 |
| Image height | 13.66 | 13.66 | 13.66 |
| Total lens length | 103.26 | 118.62 | 145.33 |
| BF | 10.65 | 10.65 | 10.65 |
| Distance of exit pupil position | −45.94 | −95.22 | −174.23 |
| d5 | 0.60 | 15.03 | 39.50 |
| d13 | 24.58 | 9.87 | 1.94 |
| d18 | 2.75 | 2.30 | 2.95 |
| d21 | 1.54 | 1.99 | 1.34 |
| d24 | 1.40 | 3.27 | 1.40 |
| d27 | 12.39 | 10.52 | 12.39 |
| d29 | 0.80 | 16.44 | 26.62 |

Zoom lens unit data

| Unit | Start surface | Focal length |
|---|---|---|
| 1 | 1 | 75.07 |
| 2 | 6 | −15.20 |
| 3 | 14 | 35.51 |
| 4 | 19 | 39.62 |
| 5 | 22 | 52.89 |
| 6 | 25 | −30.80 |
| 7 | 28 | −79.01 |
| 8 | 30 | 74.03 |
| 9 | 32 | ∞ |

Numerical Embodiment 2

[unit: mm]

Surface data

| Surface number | r | d | nd | vd |
|---|---|---|---|---|
| 1 | 90.598 | 1.60 | 1.91082 | 35.3 |
| 2 | 49.390 | 7.24 | 1.49700 | 81.5 |
| 3 | 3110.925 | 0.15 | | |
| 4 | 47.032 | 5.12 | 1.59522 | 67.7 |
| 5 | 333.551 | (variable) | | |
| 6 | 64.496 | 1.10 | 1.95375 | 32.3 |
| 7 | 13.123 | 6.72 | | |
| 8 | −30.219 | 0.80 | 1.77250 | 49.6 |
| 9 | 47.606 | 0.15 | | |
| 10 | 27.687 | 4.56 | 1.84666 | 23.9 |
| 11 | −32.439 | 0.88 | | |
| 12 | −20.371 | 0.85 | 1.69680 | 55.5 |
| 13 | −68.001 | (variable) | | |
| 14 (stop) | ∞ | 0.70 | | |
| 15* | 13.424 | 4.69 | 1.58313 | 59.4 |
| 16* | −62.764 | 0.53 | | |
| 17 | 25.857 | 1.10 | 1.83481 | 42.7 |
| 18 | 13.184 | (variable) | | |
| 19 | 33.061 | 0.60 | 1.90366 | 31.3 |
| 20 | 12.557 | 3.03 | 1.69680 | 55.5 |
| 21 | −75.746 | (variable) | | |
| 22 | 67.371 | 3.29 | 1.51633 | 64.1 |
| 23 | −13.634 | 0.78 | 2.00069 | 25.5 |
| 24 | −17.618 | (variable) | | |
| 25 | 75.645 | 1.47 | 1.89286 | 20.4 |
| 26 | −91.801 | 0.78 | 1.74951 | 35.3 |
| 27 | 15.793 | (variable) | | |
| 28* | −12.973 | 1.80 | 1.53110 | 55.9 |
| 29* | −22.776 | (variable) | | |
| 30 | −80.004 | 2.67 | 1.76200 | 40.1 |
| 31 | −33.995 | (variable) | | |
| 32 | ∞ | 1.00 | 1.54400 | 60.0 |
| 33 | ∞ | 0.97 | | |
| Image plane | ∞ | | | |

Aspheric surface data

15th surface

K = 0.00000e+000
A4 = −4.02487e−005
A6 = −1.91839e−007
A8 = 4.50566e−009
A10 = −3.01189e−011
16th surface K = 0.00000e+000
A4 = 4.45744e−005
A6 = −1.54609e−007
A8 = 5.34939e−009
A10 = −2.82301e−011
28th surface K = 0.00000e+000
A4 = 1.35785e−005
A6 = −5.77007e−007
A8 = 1.67623e−009
29th surface K = 0.00000e+000
A4 = 7.29605e−006
A6 = −4.74389e−007
A8 = 2.46966e−009
A10 = −4.09694e−012

Various data
Zoom ratio 8.12

| | Wide angle | Middle | Telephoto |
|---|---|---|---|
| Focal length | 16.00 | 45.10 | 130.00 |
| F-number | 3.61 | 5.63 | 6.49 |
| Half angle of view (deg) | 40.48 | 16.85 | 6.00 |
| Image height | 13.66 | 13.66 | 13.66 |
| Total lens length | 102.65 | 117.62 | 148.98 |
| BF | 8.67 | 8.07 | 14.14 |
| Distance of exit pupil position | −40.55 | −87.58 | −125.68 |

[unit: mm]

| | | | |
|---|---|---|---|
| d5 | 0.85 | 15.57 | 42.38 |
| d13 | 24.11 | 8.34 | 1.50 |
| d18 | 2.85 | 2.11 | 2.95 |
| d21 | 2.78 | 3.53 | 2.68 |
| d24 | 1.55 | 3.27 | 1.47 |
| d27 | 10.41 | 8.70 | 10.50 |
| d29 | 0.80 | 17.44 | 22.74 |
| d31 | 7.06 | 6.46 | 12.53 |

Zoom lens unit data

| Unit | Start surface | Focal length |
|---|---|---|
| 1 | 1 | 80.95 |
| 2 | 6 | −14.64 |
| 3 | 14 | 35.28 |
| 4 | 19 | 50.15 |
| 5 | 22 | 34.26 |
| 6 | 25 | −29.95 |
| 7 | 28 | −60.62 |
| 8 | 30 | 75.68 |
| 9 | 32 | ∞ |

Numerical Embodiment 3

[unit: mm]

Surface data

| Surface number | r | d | nd | νd |
|---|---|---|---|---|
| 1 | 71.879 | 0.80 | 1.90366 | 31.3 |
| 2 | 41.106 | 5.94 | 1.49700 | 81.5 |
| 3 | 543.623 | 0.15 | | |
| 4 | 42.800 | 4.62 | 1.60311 | 60.6 |
| 5 | 388.840 | (variable) | | |
| 6 | 96.726 | 0.80 | 1.85150 | 40.8 |
| 7 | 13.102 | 5.37 | | |
| 8 | −42.584 | 0.70 | 1.81600 | 46.6 |
| 9 | 38.380 | 0.18 | | |
| 10 | 28.079 | 4.83 | 1.85478 | 24.8 |
| 11 | −23.418 | 0.50 | | |
| 12 | −20.197 | 0.65 | 1.83481 | 42.7 |
| 13 | 1034.192 | (variable) | | |
| 14 (stop) | ∞ | 1.00 | | |
| 15 | 18.341 | 1.72 | 1.56384 | 60.7 |
| 16 | 134.844 | 0.56 | | |
| 17 | 14.201 | 0.90 | 2.00100 | 29.1 |
| 18 | 10.095 | 3.97 | 1.49700 | 81.5 |
| 19 | −317.472 | (variable) | | |
| 20 | −29.361 | 2.47 | 1.90366 | 31.3 |
| 21 | −12.951 | 0.50 | 1.69680 | 55.5 |
| 22 | 38.987 | (variable) | | |
| 23 | 23.574 | 4.51 | 1.58913 | 61.1 |
| 24 | −23.063 | 0.80 | 1.84666 | 23.8 |
| 25 | 381.350 | 0.15 | | |
| 26 | 16.862 | 3.31 | 1.58313 | 59.4 |
| 27* | −122.885 | 0.17 | | |
| 28 | ∞ | (variable) | | |
| 29 | 94.840 | 1.28 | 1.76182 | 26.5 |
| 30 | −67.463 | 0.85 | 1.69680 | 55.5 |
| 31 | 17.348 | (variable) | | |
| 32 | −30.407 | 0.65 | 1.71300 | 53.9 |
| 33 | −86.219 | (variable) | | |
| 34 | 34.265 | 3.50 | 1.48749 | 70.2 |
| 35 | 260.833 | (variable) | | |
| 36 | ∞ | 1.00 | 1.54400 | 60.0 |
| 37 | ∞ | 1.88 | | |
| Image plane | ∞ | | | |

[unit: mm]

Aspheric surface data

27th surface

K = 0.00000e+000
A4 = 1.22222e−004
A6 = −1.47170e−007
A8 = 3.40622e−009
A10 = −3.89750e−011

Various data
Zoom ratio 7.11

| | Wide angle | Middle | Telephoto |
|---|---|---|---|
| Focal length | 18.49 | 47.96 | 131.47 |
| F-number | 3.60 | 5.29 | 5.88 |
| Half angle of view (deg) | 36.46 | 15.90 | 5.93 |
| Image height | 13.66 | 13.66 | 13.66 |
| Total lens length | 100.48 | 117.41 | 141.79 |
| BF | 9.51 | 26.41 | 28.01 |
| Distance of exit pupil position | −41.80 | −55.96 | −72.44 |
| d5 | 0.85 | 13.91 | 35.72 |
| d13 | 19.79 | 7.38 | 1.77 |
| d19 | 1.82 | 3.08 | 4.22 |
| d22 | 3.58 | 2.31 | 1.18 |
| d28 | 1.99 | 3.19 | 1.08 |
| d31 | 9.07 | 7.87 | 9.98 |
| d33 | 3.00 | 2.39 | 8.97 |
| d35 | 6.98 | 23.88 | 25.48 |

Zoom lens unit data

| Unit | Start surface | Focal length |
|---|---|---|
| 1 | 1 | 70.24 |
| 2 | 6 | −13.01 |
| 3 | 14 | 20.17 |
| 4 | 20 | −30.46 |
| 5 | 23 | 20.69 |
| 6 | 29 | −32.51 |
| 7 | 32 | −66.20 |
| 8 | 34 | 80.51 |
| 9 | 36 | ∞ |

Numerical Embodiment 4

[unit: mm]

Surface data

| Surface number | r | d | nd | νd |
|---|---|---|---|---|
| 1 | 72.288 | 0.80 | 1.90366 | 31.3 |
| 2 | 42.375 | 6.15 | 1.49700 | 81.5 |
| 3 | 449.226 | 0.15 | | |
| 4 | 44.172 | 5.03 | 1.60311 | 60.6 |
| 5 | 268.446 | (variable) | | |
| 6* | 95.003 | 0.80 | 1.85150 | 40.8 |
| 7 | 11.663 | 5.20 | | |
| 8 | −36.717 | 0.70 | 1.81600 | 46.6 |
| 9 | 29.723 | 0.15 | | |
| 10 | 27.029 | 4.49 | 1.85478 | 24.8 |
| 11 | −22.072 | −0.14 | | |
| 12 | −21.609 | 0.65 | 1.83481 | 42.7 |
| 13 | −290.245 | (variable) | | |
| 14 (stop) | ∞ | 1.00 | | |

-continued

[unit: mm]

| | | | | |
|---|---|---|---|---|
| 15 | 18.501 | 1.61 | 1.56384 | 60.7 |
| 16 | 143.057 | 0.51 | | |
| 17 | 14.062 | 0.90 | 2.00100 | 29.1 |
| 18 | 10.124 | 4.02 | 1.49700 | 81.5 |
| 19 | −354.111 | (variable) | | |
| 20 | −28.966 | 1.69 | 1.90366 | 31.3 |
| 21 | −13.305 | 0.50 | 1.69680 | 55.5 |
| 22 | 38.632 | (variable) | | |
| 23 | 23.532 | 3.07 | 1.58913 | 61.1 |
| 24 | −24.593 | 0.80 | 1.84666 | 23.8 |
| 25 | 508.567 | 0.76 | | |
| 26 | 17.126 | 2.93 | 1.58313 | 59.4 |
| 27* | −84.305 | 0.17 | | |
| 28 | ∞ | (variable) | | |
| 29 | 95.836 | 1.63 | 1.76182 | 26.5 |
| 30 | −1029.176 | 1.59 | 1.69680 | 55.5 |
| 31 | 15.800 | (variable) | | |
| 32 | −31.845 | 0.65 | 1.71300 | 53.9 |
| 33 | −76.964 | (variable) | | |
| 34 | 27.717 | 3.50 | 1.48749 | 70.2 |
| 35 | 232.654 | (variable) | | |
| 36 | ∞ | 1.00 | 1.54400 | 60.0 |
| 37 | ∞ | 2.07 | | |
| Image plane | ∞ | | | |

Aspheric surface data

6th surface

K = 0.00000e+000
A4 = 4.58937e−006
A6 = −1.95268e−008
A8 = −3.41621e−011
A10 = 2.63094e−013

27th surface

K = 0.00000e+000
A4 = 1.27786e−004
A6 = −1.34741e−007
A8 = 1.49999e−009
A10 = −1.87239e−011

Various data
Zoom ratio 8.57

| | Wide angle | Middle | Telephoto |
|---|---|---|---|
| Focal length | 15.28 | 44.53 | 130.97 |
| F-number | 3.67 | 5.67 | 6.30 |
| Half angle of view (deg) | 41.80 | 17.05 | 5.95 |
| Image height | 13.66 | 13.66 | 13.66 |
| Total lens length | 96.51 | 116.56 | 143.14 |
| BF | 7.74 | 27.72 | 33.65 |
| Distance of exit pupil position | −41.57 | −53.63 | −62.78 |
| d5 | 0.70 | 16.87 | 41.58 |
| d13 | 20.09 | 6.90 | 1.79 |
| d19 | 2.85 | 4.80 | 6.52 |
| d22 | 3.70 | 1.76 | 0.04 |
| d28 | 2.55 | 2.93 | 0.56 |
| d31 | 6.46 | 6.08 | 8.46 |
| d33 | 3.09 | 0.18 | 1.22 |
| d35 | 5.02 | 25.00 | 30.93 |

Zoom lens unit data

| Unit | Start surface | Focal length |
|---|---|---|
| 1 | 1 | 75.87 |
| 2 | 6 | −12.19 |
| 3 | 14 | 19.88 |
| 4 | 20 | −29.55 |
| 5 | 23 | 19.53 |
| 6 | 29 | −28.22 |
| 7 | 32 | −76.65 |

-continued

[unit: mm]

| 8 | 34 | 64.19 |
|---|---|---|
| 9 | 36 | ∞ |

Numerical Embodiment 5

[unit: mm]

Surface data

| Surface number | r | d | nd | vd |
|---|---|---|---|---|
| 1 | 132.605 | 1.60 | 1.91082 | 35.3 |
| 2 | 58.122 | 5.92 | 1.49700 | 81.5 |
| 3 | −244.066 | 0.15 | | |
| 4 | 48.149 | 4.75 | 1.59522 | 67.7 |
| 5 | 294.080 | (variable) | | |
| 6 | 65.163 | 1.10 | 1.95375 | 32.3 |
| 7 | 13.478 | 6.02 | | |
| 8 | −31.204 | 0.80 | 1.77250 | 49.6 |
| 9 | 55.267 | 0.15 | | |
| 10 | 27.307 | 4.51 | 1.84666 | 23.9 |
| 11 | −34.858 | 1.73 | | |
| 12 | −20.085 | 0.85 | 1.69680 | 55.5 |
| 13 | −65.323 | (variable) | | |
| 14 (stop) | ∞ | 1.99 | | |
| 15* | 13.290 | 4.12 | 1.58313 | 59.4 |
| 16* | −69.801 | 1.10 | | |
| 17 | 25.242 | 0.74 | 1.83481 | 42.7 |
| 18 | 12.854 | 1.29 | | |
| 19 | 28.547 | 0.60 | 1.90366 | 31.3 |
| 20 | 13.758 | 2.80 | 1.69680 | 55.5 |
| 21 | 294.210 | 3.10 | | |
| 22 | 106.272 | 3.35 | 1.51633 | 64.1 |
| 23 | −12.282 | 0.78 | 2.00069 | 25.5 |
| 24 | −16.562 | (variable) | | |
| 25 | 38.064 | 1.56 | 1.89286 | 20.4 |
| 26 | 176.176 | 0.78 | 1.74951 | 35.3 |
| 27 | 15.663 | (variable) | | |
| 28 | −10.833 | 1.80 | 1.53160 | 55.8 |
| 29* | −14.589 | (variable) | | |
| 30 | −34.238 | 1.97 | 1.76200 | 40.1 |
| 31 | −25.948 | 4.85 | | |
| 32 | ∞ | 1.00 | 1.54400 | 60.0 |
| 33 | ∞ | 1.50 | | |
| Image plane | ∞ | | | |

Aspheric surface data

15th surface

K = 0.00000e+000
A4 = −3.92563e−005
A6 = −5.42634e−008
A8 = 9.79745e−010
A10 = −1.69466e−011

16th surface

K = 0.00000e+000
A4 = 3.96295e−005
A6 = −4.82165e−008
A8 = 2.47142e−009
A10 = −2.63605e−011

29th surface

K = 0.00000e+000
A4 = −1.74255e−005
A6 = −1.31890e−007
A8 = 7.00225e−010
A10 = −9.96256e−012

-continued

[unit: mm]

Various data
Zoom ratio 5.52

|  | Wide angle | Middle | Telephoto |
|---|---|---|---|
| Focal length | 18.10 | 44.41 | 100.00 |
| F-number | 3.35 | 4.70 | 5.60 |
| Half angle of view (deg) | 37.04 | 17.10 | 7.78 |
| Image height | 13.66 | 13.66 | 13.66 |
| Total lens length | 101.37 | 116.16 | 141.89 |
| BF | 7.00 | 7.00 | 7.00 |
| Distance of exit pupil position | −44.58 | −73.02 | −102.17 |
| d5 | 0.73 | 15.44 | 36.74 |
| d13 | 22.07 | 8.04 | 3.00 |
| d24 | 2.19 | 4.58 | 2.77 |
| d27 | 14.32 | 10.21 | 11.26 |
| d29 | 1.50 | 17.33 | 27.56 |

Zoom lens unit data

| Unit | Start surface | Focal length |
|---|---|---|
| 1 | 1 | 82.06 |
| 2 | 6 | −15.41 |
| 3 | 14 | 19.87 |
| 4 | 25 | −42.04 |
| 5 | 28 | −94.95 |
| 6 | 30 | 127.53 |
| 7 | 32 | ∞ |

TABLE 1

| | Conditional Expression | Embodiment 1 | Embodiment 2 | Embodiment 3 | Embodiment 4 | Embodiment 5 |
|---|---|---|---|---|---|---|
| (1) | $8.0 < Dw/skw < 20.0$ | 9.70 | 11.83 | 10.56 | 11.47 | 14.48 |
| (2) | $0.8 < \beta np < 3.0$ | 1.08 | 1.12 | 1.07 | 1.01 | 1.12 |
| (3) | $0.1 < f(N-2)/f(N-1) < 2.0$ | 0.39 | 0.49 | 0.49 | 0.37 | 0.44 |
| (4) | $-10.0 < (1 - \beta f^2) \times \beta rt^2 < -3.0$ | −7.32 | −7.22 | −5.54 | −5.31 | −4.51 |
| (5) | $3.0 < fN/skw < 40.0$ | 6.95 | 8.73 | 8.46 | 8.29 | 18.22 |
| (6) | $-5.0 < f(N-2)/fw < -1.0$ | −1.66 | −1.87 | −1.76 | −1.85 | −2.32 |
| (7) | $2.0 < f1/fw < 8.0$ | 4.04 | 5.06 | 3.80 | 4.97 | 4.53 |
| (8) | $-4.0 < POw/fw < -1.0$ | −2.01 | −2.05 | −1.85 | −2.35 | −2.16 |
| (9) | $2.5 < ft/fw < 50.0$ | 7.83 | 8.12 | 7.11 | 8.57 | 5.52 |
| (10) | $0.3 < |m(N-2)mid/m(N-1)mid| < 1.5$ | 0.88 | 0.89 | 0.93 | 0.97 | 0.73 |
| (11) | $-7.0 < m1/fw < -1.0$ | −2.27 | −2.90 | −2.23 | −3.05 | −2.24 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-153564, filed Aug. 4, 2016, which is hereby incorporated by reference herein in its entirety.

What is claimed is:

1. A zoom lens comprising, in order from an object side to an image side, a first lens unit having a positive refractive power, a second lens unit having a negative refractive power, a middle lens group including at least one lens unit, (N-2)th lens unit having a negative refractive power, an (N-1)th lens unit having a negative refractive power, and an Nth lens unit having a positive refractive power, where N is an integer of six or more, wherein distances between the adjacent lens units change during zooming, the first lens unit moves toward the object side during zooming from a wide-angle end to a telephoto end, the (N-2)th lens unit moves during focusing, and the following conditional expressions are satisfied:

$$8.0 < Dw/skw < 20.0; \text{ and}$$

$$0.8 < \beta np < 3.0,$$

where Dw represents a total lens length at the wide-angle end, skw represents a backfocus at the wide-angle end, and βnp represents a lateral magnification of a combined system of the (N-1)th lens unit and the Nth lens unit at the wide-angle end.

2. The zoom lens according to claim 1, wherein the following conditional expression is satisfied:

$$0.1 < f(N-2)/f(N-1) < 2.0,$$

where f(N−2) represents a focal length of the (N-2)th lens unit and f(N−1) represents a focal length of the (N-1)th lens unit.

3. The zoom lens according to claim 1, wherein the following conditional expression is satisfied:

$$-10.0 < (1 - \beta f^2) \times \beta rt^2 < -3.0,$$

where βf represents a lateral magnification of the (N-2)th lens unit at the telephoto end and βrt represents a lateral magnification of a combined system of the (N-1)th lens unit and the Nth lens unit at the telephoto end.

4. The zoom lens according to claim 1, wherein the following conditional expression is satisfied:

$$3.0 < fN/skw < 40.0,$$

where fN represents a focal length of the Nth lens unit and skw represents a backfocus at the wide-angle end.

5. The zoom lens according to claim 1, wherein the following conditional expression is satisfied:

$$-5.0 < f(N-2)/fw < -1.0,$$

where f(N−2) represents a focal length of the (N-2)th lens unit and fw represents a focal length of the zoom lens at the wide-angle end.

6. The zoom lens according to claim 1, wherein the following conditional expression is satisfied:

$$2.0 < f1/fw < 8.0,$$

where f1 represents a focal length of the first lens unit and fw represents a focal length of the zoom lens at the wide-angle end.

7. The zoom lens according to claim 1, wherein the following conditional expression is satisfied:

$$-4.0 < POw/fw < -1.0,$$

where POw represents a distance from an image plane to an exit pupil position at the wide-angle end and fw represents a focal length of the zoom lens at the wide-angle end.

8. The zoom lens according to claim 1, wherein the following conditional expression is satisfied:

$$2.5 < ft/fw < 50.0,$$

where ft represents a focal length of the zoom lens at the telephoto end and fw represents a focal length of the zoom lens at the wide-angle end.

9. The zoom lens according to claim 1, wherein fM represents a focal length of the zoom lens at a middle zoom position, and is defined as fM=√(fw×ft), where fw represents a focal length of the zoom lens at the wide-angle end and ft represents a focal length of the zoom lens at the telephoto end, and the following conditional expression is satisfied:

$$0.3 < |m(N-2)mid/m(N-1)mid| < 1.5,$$

where m(N−2)mid represents a movement amount of the (N-2)th lens unit during zooming from the wide-angle end to the middle zoom position, and m(N−1)mid represents a movement amount of the (N-1)th lens unit during zooming from the wide-angle end to the middle zoom position.

10. The zoom lens according to claim 1, wherein the following conditional expression is satisfied:

$$-7.0 < m1/fw < -1.0,$$

where m1 represents a movement amount of the first lens unit during zooming from the wide-angle end to the telephoto end and fw represents a focal length of the zoom lens at the wide-angle end.

11. The zoom lens according to claim 1, wherein the Nth lens unit does not move during zooming.

12. The zoom lens according to claim 1, wherein the (N-2)th lens unit includes a single lens or a cemented lens of two lenses cemented with each other.

13. The zoom lens according to claim 1, wherein the middle lens group includes, in order from the object side to the image side, a third lens unit having a positive refractive power, a fourth lens unit having a positive refractive power, and a fifth lens unit having a positive refractive power.

14. The zoom lens according to claim 1, wherein the middle lens group includes, in order from the object side to the image side, a third lens unit having a positive refractive power, a fourth lens unit having a negative refractive power, and a fifth lens unit having a positive refractive power.

15. The zoom lens according to claim 1, wherein the middle lens group includes a third lens unit having a positive refractive power.

16. An image pickup apparatus comprising:
a zoom lens; and
a solid-state image pickup element that receives light of an image formed by the zoom lens,
wherein the zoom lens comprises, in order from an object side to an image side, a first lens unit having a positive refractive power, a second lens unit having a negative refractive power, a middle lens group including at least one lens unit, an (N-2)th lens unit having a negative refractive power, an (N-1)th lens unit having a negative regractive power, and an Nth lens unit having a positive refractive power, where N is an integer of six or more, wherein distances between the adjacent lens units change during zooming,
the first lens unit moves toward the object side during zooming from a wide-angle end to telephoto end,
the (N-2)th lens unit moves during focusing, and
the following conditional expressions are satisfied:

$$8.0 < Dw/skw < 20.0; \text{ and}$$

$$0.8 < \beta np < 3.0,$$

where Dw represents a total lens length at the wide-angle end, skw represents a backfocus at the wide-angle end, and βnp represents a lateral magnification of a combined system of the (N-1)th lens unit and the Nth lens unit at the wide-angle end.

* * * * *